US012445220B2

(12) United States Patent
Singh et al.

(10) Patent No.: US 12,445,220 B2
(45) Date of Patent: Oct. 14, 2025

(54) OBTAINING SECURE TIME OVER A HETEROGENEOUS NETWORK

(71) Applicant: Itron, Inc., Liberty Lake, WA (US)

(72) Inventors: Kalvinder Pal Singh, Miami (AU); Zoltan Peter Kiss, Los Altos, CA (US); Darin Byron Johnson, San Jose, CA (US)

(73) Assignee: ITRON NETWORKED SOLUTIONS, INC., San Jose, CA (US)

( * ) Notice: Subject to any disclaimer, the term of this patent is extended or adjusted under 35 U.S.C. 154(b) by 370 days.

(21) Appl. No.: 18/174,476

(22) Filed: Feb. 24, 2023

(65) Prior Publication Data

US 2024/0291631 A1    Aug. 29, 2024

(51) Int. Cl.
  *H04J 3/06* (2006.01)
  *H04L 7/00* (2006.01)
  *H04L 9/32* (2006.01)
  *H04L 9/40* (2022.01)
  *H04W 12/069* (2021.01)
  *H04W 56/00* (2009.01)

(52) U.S. Cl.
  CPC .......... *H04J 3/0638* (2013.01); *H04J 3/0679* (2013.01); *H04L 7/0008* (2013.01); *H04L 9/3263* (2013.01); *H04L 63/0823* (2013.01); *H04W 12/069* (2021.01); *H04W 56/001* (2013.01)

(58) Field of Classification Search
  CPC ........ H04J 3/0635–0697; H04L 7/0008–0012; H04L 9/3263–3297; H04L 63/08–0892; H04W 56/001–0025; H04W 84/18–22
  See application file for complete search history.

(56) References Cited

U.S. PATENT DOCUMENTS

2006/0294593 A1   12/2006   Eldar et al.
2008/0307508 A1   12/2008   Conley et al.
2017/0353430 A1   12/2017   Holtmanns et al.

OTHER PUBLICATIONS

Examination Report for Canadian Application No. 3,222,102, Dated Jan. 21, 2025, 5 pages.
Franke et al., "Network Time Security for the Network Time Protocol," Published online at https://datatracker.ietf.org/doc/rfc8915/ on Sep. 30, 2020, 28 pages.
Langer, "Network Time Security: new NTP authentication mechanism," Published online at https://blog.apnic.net/2019/11/08/network-time-security-new-ntp-authentication-mechanism/ on Nov. 8, 2019, 9 pages.

(Continued)

*Primary Examiner* — Timothy J Weidner
(74) *Attorney, Agent, or Firm* — Lee & Hayes, P.C.

(57) ABSTRACT

A method of securely providing a trusted time to a first device may include receiving at a network interface controller (NIC) a neighbor list comprising a plurality of entries for a corresponding plurality of neighbor devices wherein each of the plurality of entries includes a unique device identity of a time server which the plurality of neighbor devices has reached, and an inception time of a time server certificate corresponding to the unique device identity. The method may further include sorting the plurality of entries within the neighbor list to obtain a sorted neighbor list and sending a time request to a first neighbor device of the plurality of neighbor devices based at least in part on the sorted neighbor list.

16 Claims, 19 Drawing Sheets

(56) References Cited

OTHER PUBLICATIONS

Zuccherato et al., "ISO/IEC 9798-3 Authentication SASL Mechanism," Published online at https://www.rfc-editor.org/rfc/rfc3163.html on Aug. 2001, 17 pages.

1100

OBTAINING SECURE TIME OVER A HETEROGENEOUS NETWORK

TECHNICAL FIELD

The present disclosure relates generally to computer networking. Specifically, the present disclosure relates to systems and methods for efficiently obtaining secure time with short-lived keys and certificates on a heterogenous network.

BACKGROUND

Computer networking has become ubiquitous throughout the world. In many instances, a computing network such as a mesh network may include a plurality of heterogenous computing devices that may range widely in security abilities, computing resources, and functionalities, among other differences. In some instances, one or more computing devices in the network may experience a loss of power which, due to a lack of security abilities, computing resources, functionalities, etc. may result in a loss of a secured system time that provides the computing devices with a notion of a passage of time.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Figure 1:
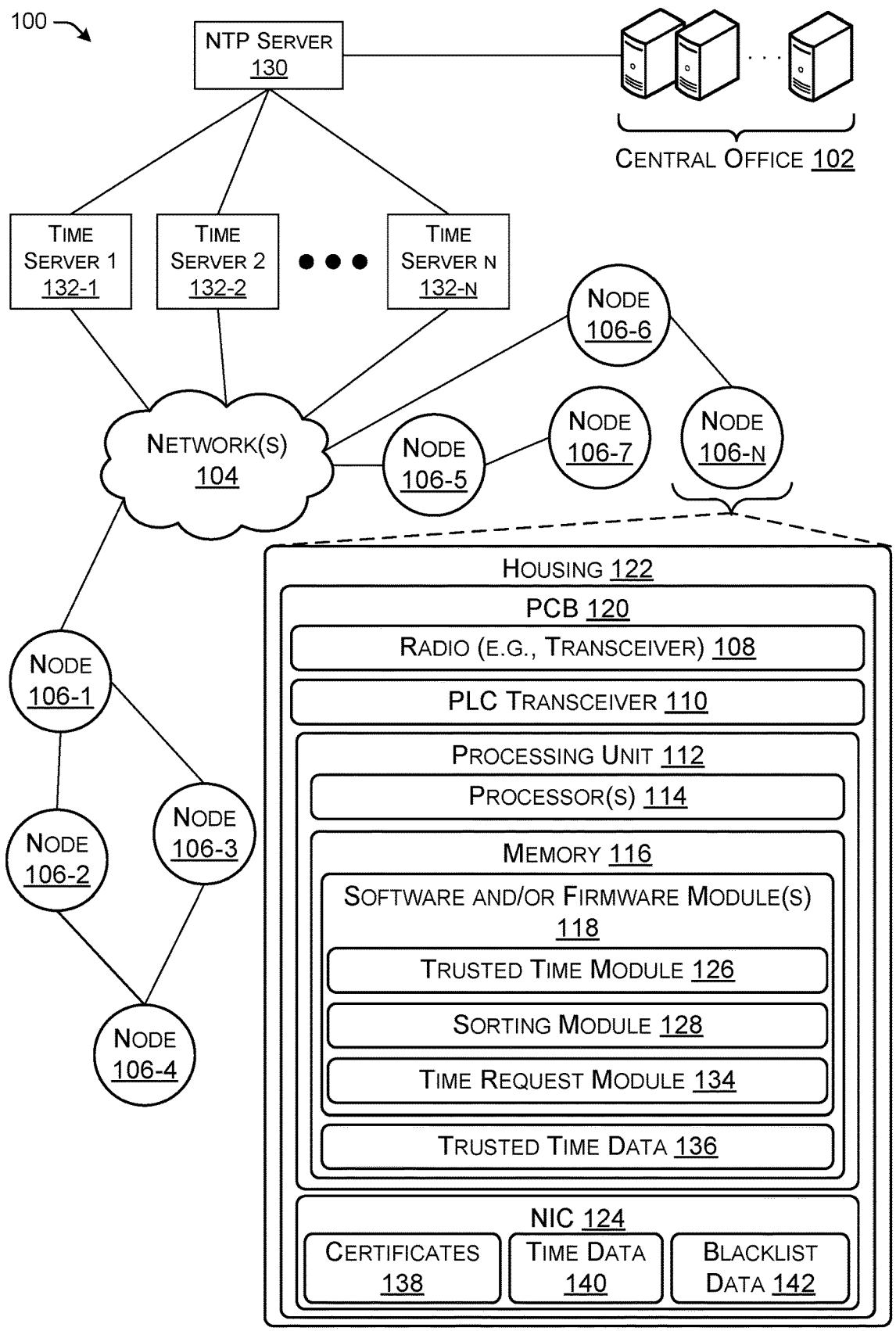
FIG. 1 is a diagram showing a high-level view of a network architecture 100 including nodes 106 configured to obtain time from a time server 132, according to an example of the principles described herein.

When one or more computing devices in a heterogenous network lose power or are otherwise unable to maintain a secure system time, those computing devices, when power comes back on, may no longer have an accurate system time. In some instances, a number of the computing devices in an area may all be powered off due to blackouts, and then restarted at the same time. This may be especially the case when the computing devices within the network do not include a battery to retain the secure time in memory and run a system clock to count a time that has transpired since the loss of power.

Further, in some instances, one or more computing devices within the network may not include a desired or required level of security to directly provide a secured time to those computing devices. Further, routing a time request message may utilize different algorithms compared to choosing the best neighbor from whom to request secure time. Tentative or pending routes may exist before the routes are considered secured. Further, a route to a time server may be required before the computing devices within the network may obtain the time. However, security links and routes within the network may not be completely validated before the computing devices within the network may obtain the time. It may be helpful to obtain a number of certificates in order to validate time in a secure manner. However, the methods surrounding obtaining those certificates may be network intensive. Further, without a secure system, the time may be set to a value well in the past for a compromised time server due to a lack of security.

For the reasons presented above, the present disclosure provides for heterogenous computing devices ranging in security abilities in a mesh network to efficiently and securely obtain time. The most secured computing devices in the network (e.g., a mesh network) may include a number of time servers acting as the source of time for the network. The present disclosure may further address instances where computing devices in an area may all be powered off due to blackouts, and then restarted at the same time. The present disclosure may further address instances where routing a time request message may have different algorithms compared to choosing a best neighbor from which to request secure time.

The present disclosure may further address instances where tentative or pending routes may exist before the routes are considered secured and allows for the use of a pending route to a time server to get time. The present disclosure may further provide for the use of a minimum time in order to obtain some validation of security links and routes before secure time is obtained. The present disclosure may further provide an efficient mechanism to obtain time server certificates to validate time, and therefore place less load on the network. The present disclosure may further stop the time from being set to a value well in the past from a compromised time server by securing the time servers.

Overview

Examples described herein provide a method of securely providing a trusted time. The method may include receiving, at a network interface controller (NIC), a neighbor list including a plurality of entries for a corresponding plurality of neighbor devices. Each of the plurality of entries may include a unique device identity of a time server which the plurality of neighbor devices has reached and an inception time of a time server certificate corresponding to the unique device identity. The method may further include sorting the plurality of entries within the neighbor list to obtain a sorted neighbor list and sending a time request to a first neighbor device of the plurality of neighbor devices based at least in part on the sorted neighbor list.

The method may further include determining a minimum time to at least temporarily validate time for the NIC. The minimum time may be determined by obtaining the minimum time from a local storage of the first device based at least in part on the first device having no time, identifying, for each of a plurality of certificates, a largest inception time, and setting the minimum time based at least in part on a first certificate being available.

The method may further include receiving, at the first device, a time response from the first neighbor device, performing a preliminary check on the time response, and determining whether the certificate exists in a local storage of the first device. The method may further include requesting the certificate from the first neighbor device based at least in part on the certificate not existing in the local storage of the first device and determining whether the certificate is received from the first neighbor device. The method may further include blacklisting the first neighbor device based at least in part on the certificate not being received from the first neighbor device, validating the time based at least in part on the certificate being received from the first neighbor device, and validating the time based at least in part on the certificate existing in the local storage of the first device.

The sorting of the plurality of entries within the neighbor list to obtain the sorted neighbor list may include identifying a new link to be added to the sorted neighbor list. The new link may include a route to the time server and a first cost value of the route. The method may further include setting a current position of the new link at a start of the sorted neighbor list and determining if an end of the sorted neighbor list has been reached. The method may further include inserting the new link into the current position in the sorted neighbor list based at least in part on the end of the neighbor list having been reached. The method may further include, based at least in part on the end of the sorted neighbor list having not been reached, determining whether the first cost value for the new link is greater than or less than a second cost value for a second link associated with the current position, setting the current position of the second link to be a next item in the sorted neighbor list based at least in part on the first cost value for the new link being greater than the second cost value for the second link associated with the current position, and inserting the new link into the current position in the sorted neighbor list based at least in part on the first cost value for the new link being less than the second cost value for the second link associated with the current position.

The method may further include determining that both the new link and the second link are unsecure links. The method may further include, based at least in part on both the new link and the second link are the unsecure links determining whether a first trust value associated with the new link is greater than or less than a second trust value associated with the second link, setting the current position of the second link to be the next item in the sorted neighbor list based at least in part on the first trust value associated with the new link being less than the second trust value associated with the second link, and inserting the new link into the current position in the sorted neighbor list based at least in part on the first trust value associated with the new link being greater than the second trust value associated with the second link.

The method may further include determining that the first trust value associated with the new link is equal to the second trust value associated with the second link and determining whether the first cost value associated with the new link is greater than or less than the second cost value associated with the second link. The method may further include setting the current position of the second link to be the next item in the sorted neighbor list based at least in part on the first cost value associated with the new link being less than the second cost value associated with the second link, and inserting the new link into the current position in the sorted neighbor list based at least in part on the first cost value associated with the new link being greater than the second cost value associated with the second link.

The first trust value and the second trust value include a value of a first value if no customer certificates are associated with the new link or the second link, respectively, a second value if an expired customer certificate that is based on the minimum time is associated with the new link or the second link, respectively, and a third value if the customer certificates associated with the new link or the second link, respectively, passed a minimum time validation check. Sending the time request to the first neighbor device of the plurality of neighbor devices based at least in part on the sorted neighbor list may include selecting the first neighbor device at a top of the sorted neighbor list, moving the first neighbor device to a blacklist, and sending a first challenge with the time request.

Examples described herein also provide a method of securely providing a trusted time. The method may include receiving, at a first neighbor device, a time request and a first challenge, determining if a secure route to a time server exists, sending the time request, the first challenge, and a second challenge to the time server based at least in part on the secure route to the time server existing, and determining if a pending route to the time server exists based at least in part on the secure route to the time server not existing. The method may further include sending, by the first neighbor device, the time request, the first challenge, and the second challenge to the time server based at least in part on the pending route to the time server existing, and, based at least in part on the pending route to the time server not existing, receiving an error message response at the first neighbor device.

The method may further include receiving a time response at the first neighbor device based at least in part on the time request including the first challenge and the second challenge, the time response being signed by the time server and including a time server address and time server certificate inception time, and receiving a dummy challenge based at least in part on the time request including the first challenge and not the second challenge.

The method may further include receiving the time response from the time server at the first neighbor device based at least in part on the first neighbor device being available and making a time defined by the time response a pending time based at least in part on the first device not being available. The method may further include obtaining at least one certificate from the time response, validating the time against the at least one certificate, and determining whether the time is valid. The method may further include discarding the pending time based at least in part on the time not being valid, and assigning the time as a secured time based at least in part on the time being valid.

Validating the time against the at least one certificate may include determining whether the certificate exists in a local storage of the first neighbor device, validating the time based at least in part on the certificate existing in the local storage of the first neighbor device, and determining whether the first neighbor device has the secured time based at least in part on the certificate not existing in the local storage of the first neighbor device. The method may further include, based at least in part on the first neighbor device not having the secured time, identifying the time as the pending time, and requesting a new time from the first neighbor device. The method may further include determining whether the first neighbor device has the time server certificate based at least in part on the first neighbor device having the secured time, obtaining the time server certificate from the time server based at least in part on the first neighbor device not having the time server certificate, and obtaining the time server certificate from the first neighbor device based at least in part on the first neighbor device having the time server certificate.

Examples described herein also provide a non-transitory computer-readable medium storing instructions that, when executed, cause a processor to perform operations. The operations may include receiving at a network interface controller (NIC) of a first device a neighbor list including a plurality of entries for a corresponding plurality of neighbor devices. Each of the plurality of entries may include a unique device identity of a time server which the plurality of neighbor devices has reached, and an inception time of a time server certificate corresponding to the unique device identity. The operations may further include sorting the plurality of entries within the neighbor list to obtain a sorted neighbor list, and sending a time request to a first neighbor device of the plurality of neighbor devices based at least in part on the sorted neighbor list.

The operations may further include determining a minimum time. The minimum time may be determined by determining whether the first device has a time, obtaining the minimum time from a local storage of the first device based at least in part on the first device having no time, and identifying, for each of a plurality of certificates, a largest inception time. The operations may further include determining if a first certificate is available, retrieving the first certificate based at least in part on the first certificate being unavailable, and determining if the retrieving is successful. The operations may further include removing the first certificate from the neighbor list based at least in part on the retrieving being unsuccessful, setting the minimum time based at least in part on the retrieving being successful, and setting the minimum time based at least in part on the first certificate being available.

The operations may further include receiving, at the first device, a time response from the first neighbor device, performing a preliminary check on the time response, and determining whether the certificate exists in a local storage of the first device. The operations may further include requesting the certificate from the first neighbor device based at least in part on the certificate not existing in the local storage of the first device, determining whether the certificate is received from the first neighbor device, and blacklisting the first neighbor device based at least in part on the certificate not being received from the first neighbor device. The operations may further include validating the time based at least in part on the certificate being received from the first neighbor device, and validating the time based at least in part on the certificate existing in the local storage of the first device.

Sorting the plurality of entries within the neighbor list to obtain the sorted neighbor list may include performing a bubble sort or a quick sort of the plurality of entries. The sorting may be based at least in part on one or more factors including a cost of a secure route to the time server, a trust value associated with a new link, a second trust value associated with a second link, a cost of a pending route, and combinations thereof.

The time server certificate may be unique to one of a plurality of time servers. The time server certificate may be derived from a customer certificate authority. The operations may further include storing the sorted neighbor list on the NIC.

Sending the time request to the first neighbor device of the plurality of neighbor devices based at least in part on the sorted neighbor list may include selecting the first neighbor device at a top of the sorted neighbor list, moving the first neighbor device to a blacklist, and sending a first challenge with the time request.

Additionally, the techniques described in this disclosure may be performed as a method and/or by a system having non-transitory computer-readable media storing computer-executable instructions that, when executed by one or more processors, performs the techniques described above.

EXAMPLE EMBODIMENTS

Turning now to the figures, FIG. 1 is a diagram showing a high-level view of a network architecture 100 including nodes 106 configured to obtain time from a time server 132, according to an example of the principles described herein. FIG. 1 also includes a component diagram of example components of a node 106 that includes the systems and devices for securely obtaining a trusted time within the network architecture 100. The network architecture 100 may include a plurality of node(s) 106-1, 106-2, 106-3, 106-4, 106-5, 106-6, 106-7, . . . , 106-N, where N is any integer greater than or equal to 1 (collectively referred to herein as node(s) 106 unless specifically addressed otherwise). The nodes 106 are communicatively coupled to each other via direct communication paths or "links." In this example, N represents a number of nodes in an autonomous routing area (ARA), such as a wide area network (WAN), metropolitan area network (MAN), local area network (LAN), neighborhood area network (NAN), field area network (FAN), personal area network (PAN), among other types of networks. As an example, nodes 106 may be configured in a radio frequency (RF) mesh, a power line communication (PLC) mesh, or both. In one example, nodes 106 may be part of a low power and lossy network (LLN). In one example, the mesh network of nodes 106 may include a heterogeneous mesh network where the nodes 106 range in an amount of available computing resources, functionality, capabilities, security constraints, power configurations such as mains and/or battery power, other varying characteristics, and combinations thereof. Further, in one example, the nodes 106 may have varying types of internal clocks where at least one of the nodes 106, when shut off due to maintenance, power outages, or other interruptions, will start their time at zero or some other initial time value when restarted since the node 106 may not include a battery to retain the time.

In one example, the nodes 106 may be classified into a number of classes including a first class that includes nodes 106 that are powered at all times, includes a relatively large number of computing resources (e.g., processing power and data storage), and includes a security module. A second class of nodes 106 may include nodes 106 that are powered at all times but include fewer computing resources and have relatively less security resources. A third class of nodes 106 may be battery powered, may include limited or very limited computing resources, and have no or very limited security resources. In this context, it may be difficult to ensure that all the nodes 106 include the secured time necessary to function in the network architecture 100 due at least in part to the varying characteristics of the nodes 106.

As used in the present specification and in the appended claims, the term "link" is meant to be understood broadly as any direct communication path between two nodes (e.g., a "one hop" transmission that is not relayed or propagated by another node). Each link may represent a plurality of channels or one or more variable data rate channels over which a node 106 is able to transmit or receive data. Each link may include multiple communication technologies, such as, for example, one or more RF communication technologies, one or more PLC communication technologies, or both (among other communication technologies). Thus, the communication technologies may utilize RF signals and/or PLC signals (among other types of signals) in communicating with one another and with other devices, systems, and networks such as, for example, a central office 102.

The central office 102 may be implemented by one or more computing devices, such as servers, personal computers, and laptop computers, among others. The one or more computing devices may be equipped with one or more processor(s) communicatively coupled to memory. In some examples, the central office 102 includes a centralized data management system which performs processing, analysis, storage, and/or management of data received from one or more of the nodes 106. For example, the central office 102 may process, analyze, store, and/or manage data obtained from a smart utility meter, sensor, control device, router, regulator, server, relay, switch, valve, and/or other nodes. Although the example of FIG. 1 illustrates the central office 102 in a single location, in some examples the central office may be distributed amongst multiple locations and/or may be eliminated entirely (e.g., in the case of a highly decentralized distributed computing platform). The central office 102 may be referred to as a back office server (BOS) herein.

One or more channels may use a power line communication (PLC) system to communicate using a PLC communications technology. Thus, a link may include portions based on multiple communication medias including PLC portions. Likewise, various links may use multiple different PLC communications technologies (e.g., various modulation techniques, bandwidths, data rates, center frequencies, protocols, etc.).

The channels on a link may include a control channel and multiple data channels. In one example, the control channel may be utilized for communicating one or more messages between nodes to specify one of the data channels utilized to transfer data. Generally, transmissions on the control channel are shorter relative to transmissions on the data channels. Once specified, the nodes 106 may move to the data channel for communication.

Each of the nodes 106 may be implemented as, or associated with, any of a variety of computing devices such as, for example, smart utility meters (e.g., electric, gas, and/or water meters), sensors (e.g., temperature sensors, weather stations, frequency sensors, etc.), control devices, transformers, routers, servers, relays (e.g., cellular relays), switches, valves, power line communication (PLC) transceivers, combinations of the foregoing, or any device couplable to a communication network and capable of sending and/or receiving data.

In this example, the nodes 106 may also be configured to communicate with one or more central processing facilities such as the central office 102 via an edge device (e.g., cellular relay, cellular router, edge router, destination oriented directed acyclic graph (DODAG) root, etc.) which serves as a connection point to a backhaul network(s), such as the Internet or one or more public or private intranets. In some examples, the central office 102 may be referred to herein as a back office server (BOS). In the illustrated example, node 106-1 may serve as an edge device and/or cellular relay to relay communications from the other nodes 106-2 through 106-N of the network architecture 100 to and from the central office 102 via the network(s) 104.

A network time protocol (NTP) server 130 may be communicatively coupled to the central office 102. The NTP server 130 may include any computing device that provides clock synchronization between computer systems using NTP as the networking protocol. In one example, the NTP server 130 may provide clock synchronization over the network(s) 104 including packet-switched, variable-latency data network(s). NTP may maintain time to within tens of milliseconds over the network(s) 104 such as a public Internet and may achieve better than one millisecond accuracy in local area networks under ideal conditions. In one example, the NTP server 130 may be included as part of the central office 102. The NTP server 130 may receive and respond to network time requests.

The network architecture 100 may further include at least one time server 132-1, 132-2, . . . 132-N, where N is any integer greater than or equal to 1 (collectively referred to herein as time server(s) 132 unless specifically addressed otherwise). The time servers 132 may be coupled between the NTP server 130 and the network(s) 104 and nodes 106. The time server(s) 132 may obtain time from the NTP server 130 via a network time request sent form the time server(s) 132 to the NTP server 130. Further, the time server(s) 132 may respond to time requests from the nodes 106 (e.g., mesh computing devices). The time servers 132 may include edge devices that may communicate with computing devices on the network(s) including the nodes 106 as well as services found over the Internet and/or an intranet.

As described herein, the nodes 106 may include devices with various capabilities, functionalities, and resources. As an example, node 106-N may be representative of each of the nodes 106 and includes a housing 122 to house various mechanical and electrical elements of the node 106-N and will be referred to herein as 106 when describing the nodes 106 collectively. The node 106 may include a printed circuit board (PCB) 120, a radio (e.g., a transceiver) 108, a PLC transceiver 110, a processing unit 112, a memory 116, and a network interface controller (NIC) 124 (sometimes referred to as a network interface card or a network adapter). The PCB 120 may include any device that mechanically supports and electrically connects electrical or electronic components using conductive traces, tracks, pads, and other features etched from one or more sheet layers of copper laminated onto and/or between sheet layers of a non-conductive, insulating substrate. The electrical or electronic components may be soldered onto the PCB 120 to both electrically connect and mechanically fasten them to the PCB 120. Elements that may be mechanically and/or electrically coupled to the PCB 120 may include the radio 108, the PLC transceiver 110, the processing unit 112 along with its processor(s) 114, the memory 116, and the NIC 124, among other elements.

The radio 108 may include a radio frequency (RF) transceiver that may be configured to receive RF signals associated with multiple different RF communication technologies (e.g., FSK, OQPSK, OFDM, CDMA, etc.) at a variety of data rates, and transmit RF signals via one or more of a plurality of RF communication technologies. The radio 108 may include a multiple protocol receiver and may be configured to listen for a plurality of different RF communication technologies in a parallel fashion across multiple links. The radio 108 may also be configured to determine, or facilitate determination of, a received signal strength, such as a "received signal strength indicator" (RSSI) for one or more of the plurality of different RF communication technologies.

In one example, each of the nodes 106 may include a single radio 108 configured to send and receive data on multiple different channels, such as the control channel and multiple data channels of each communication link. The radio 108 may also be configured to implement a plurality of different data rates, protocols, signal strengths, and/or power levels. The network architecture 100 may represent a heterogeneous network of nodes 106, in that the nodes 106 may include different types of nodes (e.g., smart meters, cellular relays, sensors, etc.), different generations or models of nodes, and/or nodes that otherwise are capable of transmitting on different channels and using different communication technologies, data rates, protocols, signal strengths, and/or power levels in addition to the varying capabilities, functionalities, and computing resources of the nodes 106 as described above.

The power line communication (PLC) transceiver 110 may be configured to transmit and/or receive one or more communication signals on electrical power wiring, including local power wiring and long distance high voltage transmission lines. The PLC transceiver 110 may transmit and/or receive different types of power line communications that include one or more PLC communication technologies (e.g., narrowband PLC, broadband PLC, power line digital subscriber line (PDSL), power line telecom (PLT), power line networking (PLN), broadband over power lines (BPL), etc.) having one or more frequency bands, channels, data rates and/or types of modulation that may depend on the propagation characteristics of the power wiring used. In one example, the node 106 may further include any wired communications channels and/or technologies to communicatively couple the node 106 to any of a number of additional devices within the network architecture 100.

The processing unit 112 is coupled to the radio 108, the PLC transceiver 110, the memory 116, and the NIC 124 and may include one or more processor(s) 114 communicatively coupled to the memory 116. The memory 116 may be configured to store one or more software and/or firmware module(s) 118, which are executable on the processor(s) 114 to implement various functions. While the modules are described herein as being software and/or firmware executable on a processor, in other examples, any or all of the modules may be implemented in whole or in part by hardware (e.g., as an application specific integrated circuit (ASIC), a specialized processing unit, digital signal processor, etc.) to execute the described functions.

The memory 116 may include any software and/or firmware executable to bring about any function of the node 106 including sending and receiving communications and processing data and performing any functions of the node 106 described herein. In one example of FIG. 1, the memory 116 may include any software and/or firmware executable to bring about any function of the node 106 as a utility meter and a device within a network of nodes 106 including send and receive communications, detect utility consumption, and process data, among other functions of a utility meter. However, the present systems and methods described herein may be applied to any type of computing devices communicatively coupled within a network.

The memory 116 may include computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

The network(s) 104 may represent a backhaul network, which may itself include a wireless or a wired network, or a combination thereof. The network(s) 104 may be a collection of individual networks interconnected with each other and functioning as a single large network (e.g., the Internet and/or one or more intranets). The individual networks may be wireless or wired networks, or a combination thereof. In one example, the network(s) may include a mesh network.

The node 106 may include the memory 116 described above which may include one or multiple repositories or other storage locations for persistently storing and managing collections of data such as databases, simple files, binary, and/or any other data. The memory 116 may include one or more storage locations that may be managed by one or more database management systems. The memory 116 may store, for example, the software and/or firmware module(s) 118 defining computer-executable code utilized by the processor(s) 114 to execute code designed to bring about the functionality of the node 106 described herein. Further, the memory may contain trusted time data 136 defining any data associated with the requesting, reception, sorting, processing, and transmission of a time data.

The memory 116 may store portions or components of time acquisition services as part of the software and/or firmware module(s) 118. For instance, the time acquisition services of the software and/or firmware module(s) 118 may include a trusted time module 126 to, when executed by the processor(s) 114, process trusted time data 136 and store in the memory 116 the trusted time data 136. The trusted time module 126 may perform any functionality related to the requesting, reception, sorting, processing, and transmission of a time data as described herein.

The software and/or firmware module(s) 118 may also include a sorting module 128. The sorting module 128 may, when executed by the processor(s) 114, sort data including a neighbor list, according to the techniques described herein. The sorting performed by the sorting module 128 may include use of a bubble sort, a quick sort, or other type of sorting algorithm to sort entries within the neighbor list based on cost values of a secure route, trust values based on certificates, cost values of a pending route, and other parameters. In one example, the sorting module 128 sorts a plurality of entries within the neighbor list to obtain a sorted neighbor list 602.

The software and/or firmware module(s) 118 may also include a time request module 134. The time request module 134 may, when executed by the processor(s) 114, send a number of time requests to a neighbor device (e.g., a neighboring node 106) relative to the node 106 of a plurality of neighbor devices based at least in part on the sorted neighbor list. In this manner, the first-listed neighbor in the sorted neighbor list from which the node 106 may have the best chance of directly or indirectly obtaining time from is selected as the node to which the time request module 134 will send the time request.

The NIC 124 may be communicatively coupled to the PCB 120 and/or the processing unit 112 in order to interact with the software and/or firmware module(s) 118 in bringing about the requesting, reception, sorting, processing, and transmission of a time data as described herein. The NIC may store in a data storage device of the NIC 124 (not shown) data including, for example, a number of certificates 138, time data 140, and blacklist data 142. In one example, the certificates 138, time data 140, and blacklist data 142 may be redundantly stored in the memory 116.

Although depicted as being associated with the software and/or firmware module(s) 118, the trusted time module 126, the sorting module 128, and/or the time request module 134 may be included as part of the NIC 124 in addition to or in place of the software and/or firmware module(s) 118. In one example, the NIC 124 may include a smart NIC functioning as a programmable accelerator that makes data center networking, security, and storage efficient and flexible and may offload from the processor(s) 114 one or mode functionalities described herein.

Figure 2:
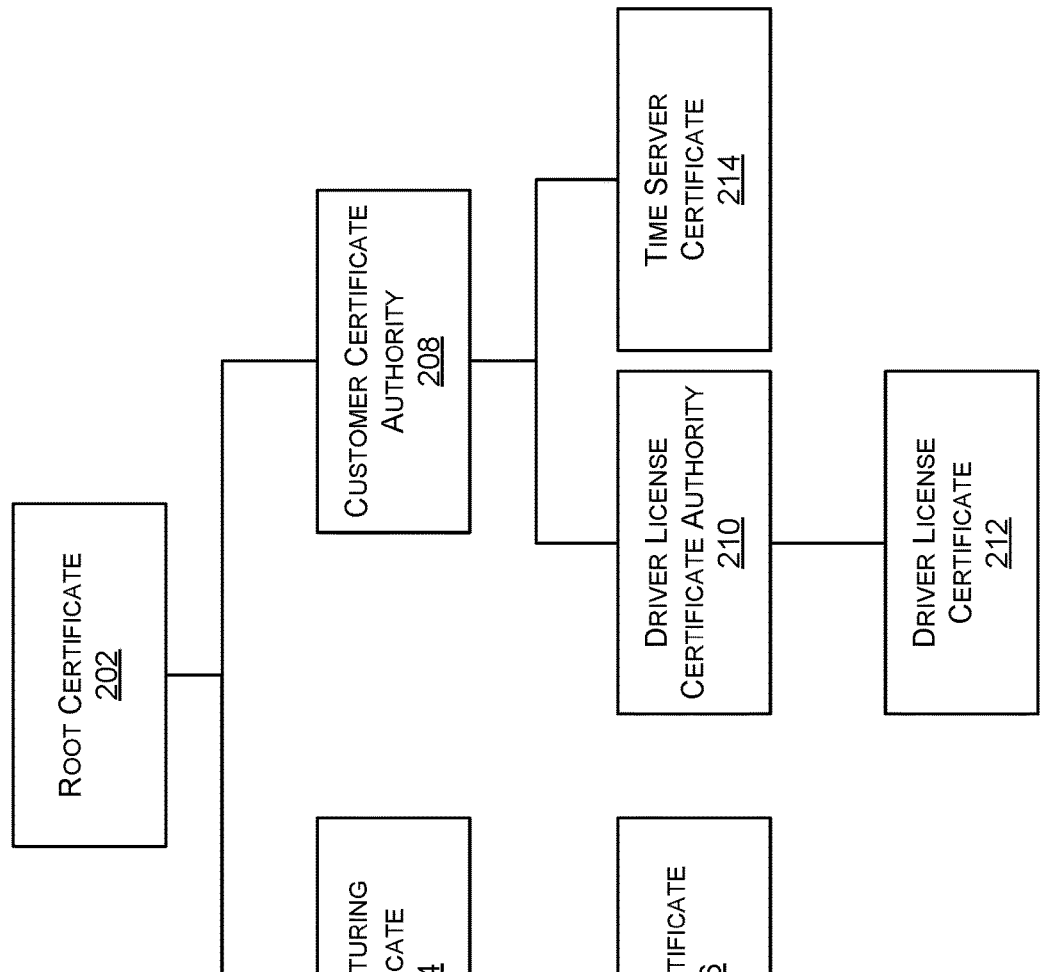
FIG. 2 is a diagram showing a certificate tree including a time server certificate, according to an example of the principles described herein.

FIG. 2 is a diagram showing a certificate tree 200 including a time server certificate 214, according to an example of the principles described herein. Data defining the certificate tree 200 and the individual certificate information included therein may be stored in the NIC 124 of the nodes 106 as the certificates 138 described herein. In this manner, the NIC 124 of the node 106 may be used to authorize the node 106 as to any other nodes 106, the network(s) 104, the time servers 132, the NTP server 130, the central office, 102, other computing devices within the network architecture 100, and combinations thereof.

The systems and methods described herein utilize a time server certificate 214. The time server certificate 214 may include unique attributes that are specifically associated with one of the time servers 132. The unique attributes may include a new policy included within the certificates at the time of certificate creation. Thus, a certificate tree 200 illustrated in FIG. 2 may assist in validating links, routes, computing devices within the network, time, and other characteristics of the computing devices described herein.

The certificate tree 200 may include a root certificate 202. The root certificate 202 may be a public key certificate that identifies a root certificate authority (CA). In one example, the root certificate 202 may be self-signed and may form the basis of a public key infrastructure (PKI). The certificate tree 200 may be hierarchal in nature.

A certificate authority can issue multiple certificates in the form of a tree structure. The root certificate 202 is the top-most certificate of the certificate tree 200 and may include the private key which is used to sign other certificates within the certificate tree 200. All certificates signed by the root certificate, with a "CA" field set to true, may inherit the trustworthiness of the root certificate 202. Such a certificate may be referred to as an intermediate certificate or subordinate CA certificate. Certificates further down the certificate tree 200 may also depend on the trustworthiness of the intermediates. In one example, the root certificate 202 may be made trustworthy by some mechanism other than a certificate, such as by secure physical distribution. For example, some of the best-known root certificates 202 may be distributed in operating systems by their manufacturers. Each of the certificates within the certificate tree 200 of FIG. 2 represents a certificate and corresponding private key that are particular to a respective node 106 and/or NIC 124.

With the certificate tree 200 describe above, a manufacturing certificate 204 and a customer CA 208 may depend from the root certificate 202. The manufacturing certificate 204 may be defined by data that indicates where the node 106 and/or the NIC 124 was manufactured and who manufactured the node 106 and/or the NIC 124.

Further, the customer CA 208 may be defined by data that uniquely identifies a particular customer or purchaser of the node 106 and/or NIC 124 and/or a customer that is subscribed to a service via the node 106 and/or NIC 124. A CA may include any entity that stores, signs, and issues digital certificates. Further, a digital certificate may certify the ownership of a public key by the named subject of the certificate. This allows other devices to rely upon signatures or on assertions made about the private key that corresponds to the certified public key.

A birth certificate 206 may depend from the manufacturing certificate 204. The birth certificate 206 may be defined by data that uniquely identifies that particular node 106 and/or NIC 124 and includes any security credentials for the NIC 124. The birth certificate 206 may be supplied to the node 106 and/or NIC 124 at the time of manufacturing of the node 106 and/or NIC 124.

The certificate tree 200 may further include intermediate CAs such as the driver license CA 210. The driver license CA 210, like the customer CA 208, may correspond to the customer, and may be used to uniquely identify the node 106 and/or NIC 124. A driver license certificate 212 may be derived from the driver license CA 210 and serves to uniquely identify the node 106 and/or NIC 124 by demonstrating that the node 106 and/or NIC 124 has at one point in its lifetime been a part of the network architecture 100.

The time server certificate 214 may depend from the customer CA 208 within the certificate tree 200 and may be derived from the customer CA 208. The time server certificate 214 may have a relatively higher degree of trust compared to, for example, the driver license certificate 212 obtained from a neighbor node 106 and/or neighbor NIC 124. A neighbor node 106 and/or neighbor NIC 124 may not be as physically secure as, for example, a time server 132.

In one example, the link layer certificates within the certificate tree 200 may include driver license certificate 212 that each node 106 and/or NIC 124 may obtain and demonstrate that the node 106 and/or NIC 124 has at one point in its lifetime been a part of the network architecture 100. Further, the link layer certificates within the certificate tree 200 may further include the time server certificate 214.

Figure 3:
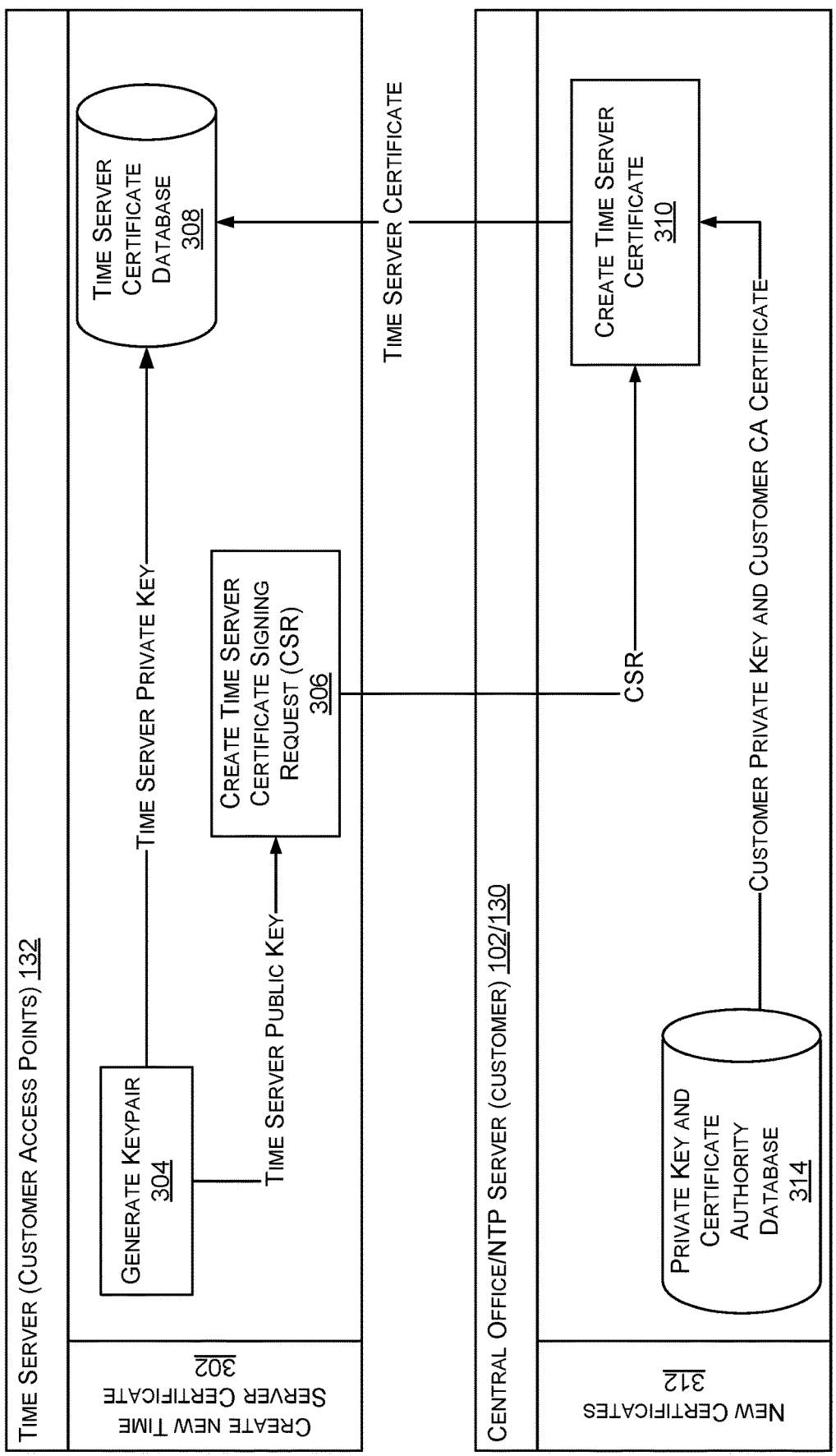
FIG. 3 illustrates a call flow diagram of requesting and creating a time server certificate, according to an example of the principles described herein.

FIG. 3 illustrates a call flow diagram of requesting and creating a time server certificate 214, according to an example of the principles described herein. The time server certificate 214 may be generated at 302 through an interaction between one of the time servers 132 functioning as a customer access point and the central office 102 and/or the NTP server 130 acting as the customer or on behalf of the customer. The creation of a new time server certificate 302 may include, at the time server 132, generating a key pair 304. The time server private key may be sent to and stored at a time server certificate database 308 and is never allowed by the time server 132 to leave the time server 132 or be leaked to another device. A time server public key, however, may be used to create a time server certificate signing request (CSR) at 306.

The time server CSR may be sent to the central office 102 and/or the NTP server 130 and used to create the time server certificate 310. The new certificates 312 may be generated by ending a customer private key and customer CA certificate from a private key and certificate authority database 314 to create the time server certificate 310. The time server certificate may be sent to and stored in the time server certificate database 308. Although the method of creation of the time server certificate is described in connection with FIG. 3, any method and/or system for creation of the time server certificate may be used. The time server certificate provides the credentials used to access a time server 132 in order to obtain a secure time.

Figure 4:
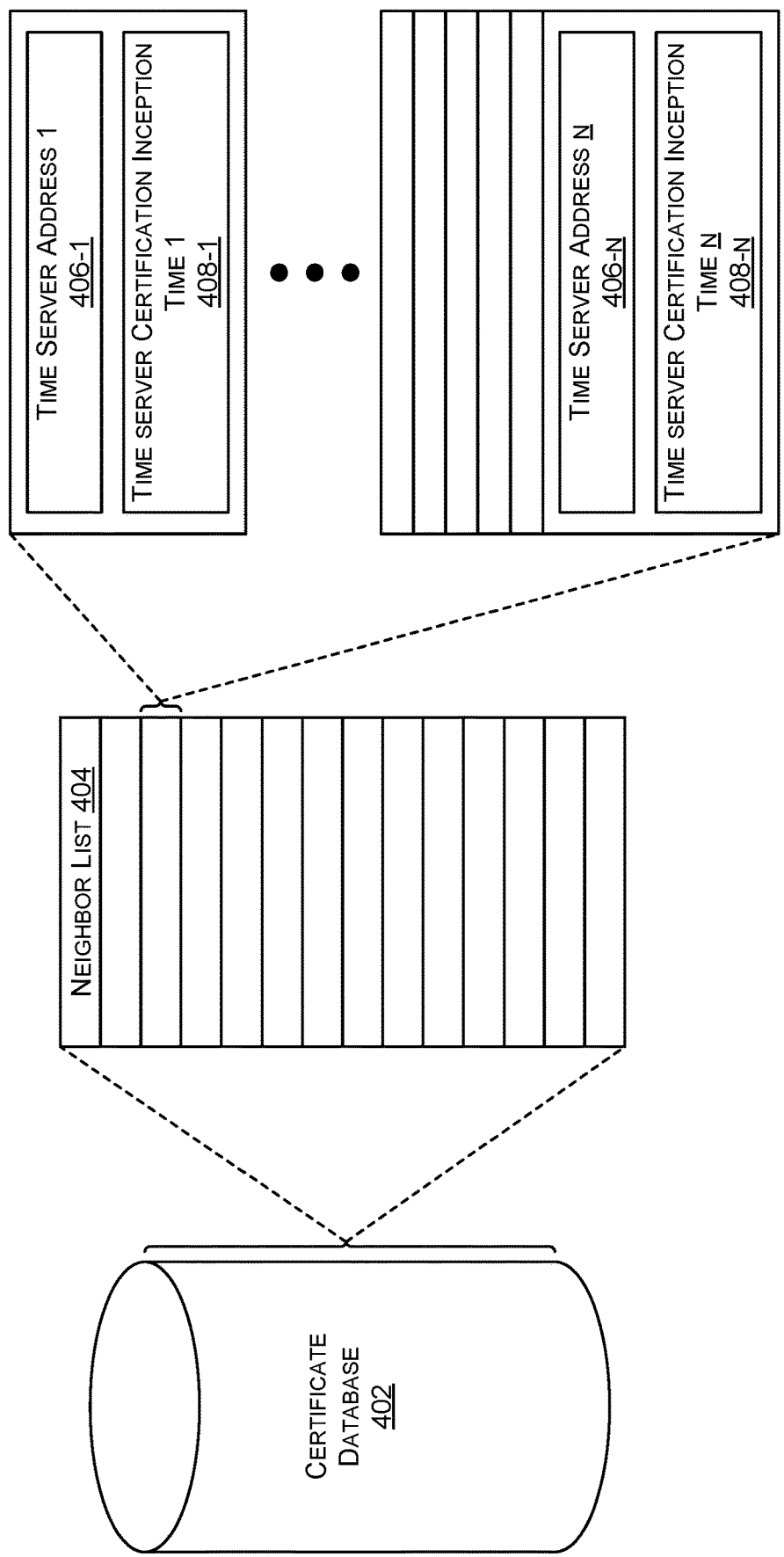
FIG. 4 is a diagram showing certificate information associated with a plurality of neighbor nodes in a neighbor list, according to an example of the principles described herein.

FIG. 4 is a diagram showing certificate information associated with a plurality of neighbor nodes 106 in a neighbor list 404, according to an example of the principles described herein. Each NIC 124 of each node 106 may store a neighbor list 404 within a certificate database 402 that stores a number of time server certificates and link layer certificates. The neighbor list 404 may include a number of entries for each of a number of neighbor nodes 106 within the network(s) 104. In one example, the neighbor list 404 may include data for all of the nodes 106 within the network(s) 104. In one example, the neighbor list 404 may include data for a plurality of the nodes 106 within the network(s) 104 such as, for example, nodes 106 within a predefined number of hops from an originating node 106, nodes 106 within a same subnetwork or subgroup, or other parameters defining a group or subgroup of the nodes 106.

Each entry within the neighbor list 404 may include a time server address 406-1, . . . 406-N, where N is any integer greater than or equal to 1 (collectively referred to herein as time server address(es) 406 unless specifically addressed otherwise) of the time server 132 from which that neighbor node 106 obtained its time. Further, each entry within the neighbor list 404 may include a time server certificate inception time 408-1, . . . 408-N, where N is any integer greater than or equal to 1 (collectively referred to herein as time server certificate inception time(s) 408 unless specifically addressed otherwise) that defines the inception time for the time server certificate that was created for that node 106 by the time server 132 identified by the time server address 406. With this information, a given node 106 may be able to determine a minimum time for that node 106. However, the validity of the time server certificate inception times 408 for each of the time server addresses 406 may be in the unknown state if the actual certificate does not exist in a data storage device (e.g., a data storage device storing the certificate database 402) of the respective NICs 124 of the nodes 106. In one example, each node 106 may share the time server address 406 of the time server 132 that node 106 used to reach that time server 132 as well as the time server certificate inception time 408 of the time server certificate for that address.

Figure 5:
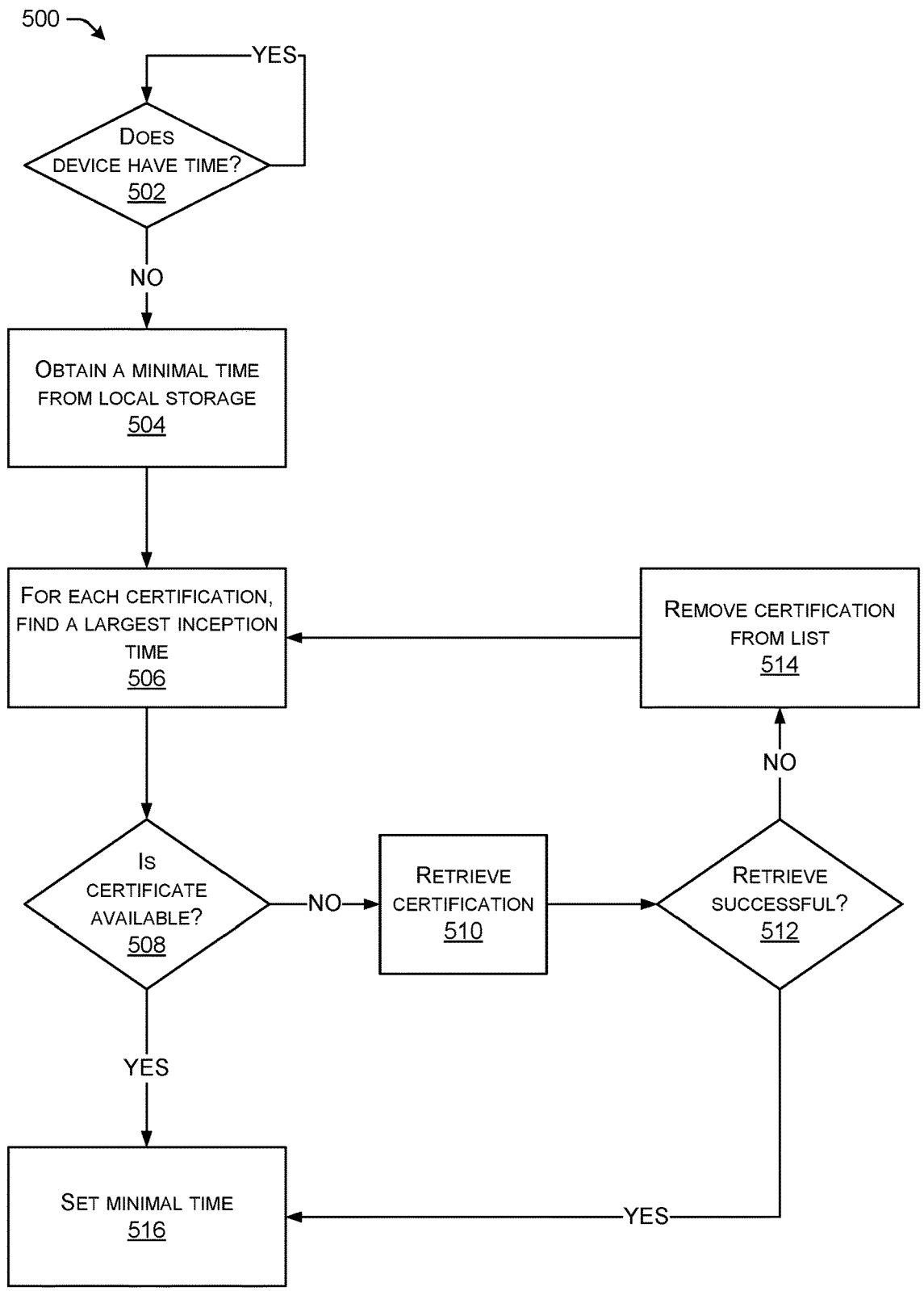
FIG. 5 illustrates a flow diagram of an example method for determining a minimum trusted time, according to an example of the principles described herein.

The time server certificate inception times 408 may be used to determine a minimum trusted time. FIG. 5 illustrates a flow diagram of an example method 500 for determining a minimum trusted time, according to an example of the principles described herein. When a computing device such as, for example, a node 106, goes offline, is powered down, or otherwise loses its trusted time, that node 106 may no longer have the trusted time when it is booted up or started again. However, the node 106 may calculate a minimum trusted time where the node 106 may determine that the trusted time must be at least greater than a determinable value. The time server certificate inception times 408 stored in the neighbor list 404 as described above in connection with FIG. 4 may be used for this purpose.

Thus, when a computing device within the network architecture 100 such as a node 106 starts and does not have a secured time value, the node 106 may calculate a minimal trusted time where the node 106 may determine that the trusted time must be greater than a given value. For example, the node 106 may determine the trusted time by storing time in long term storage, embedding build time into the software and/or firmware module(s) 118, embedding manufacturing time, and combinations thereof. However, if the node 106 has been, for example, shelved for an extended period of time, then the trusted time value may be far in the past. In the examples described herein, the time server certificate inception times 408 of the link layer certificate (e.g., the driver license certificate 212) and the time server certificate 214 may be made to be the same as the time the certificates are created. The link layer certificate (e.g., the driver license certificate 212) and the time server certificate 214 may be updated on a regular basis, and, therefore, the minimal trusted time may be derived from these certificates. In contrast, for other certificates where their inception time is used to inform the nodes 106 to start using the certificates at a future time, the nodes 106 cannot use this method. FIG. 5 provides the workflow on a method 500 to calculate the minimal trusted time.

As depicted in FIG. 5, the method 500 for determining a minimum trusted time may include, at 502, determining whether a first device such as a node 106 has a time. If the node 106 does have a time (502, determination YES), no further processing is required, and the method may loop back to 502 to await an instance in which the node 106 no longer has the trusted time. If, in contrast, the node 106 does not have a time (502, determination NO), then the node 106 may obtain 504 the minimum time from a local storage of the node 106 based at least in part on the node 106 having no time. At 506, each of a plurality of certificates within the neighbor list 404 may be inspected to identify a largest (e.g., most recent) time server certificate inception time 408. At 508, it may be determined if a first certificate associated with the largest inception time is available. The method 500 may further include, at 510, retrieving the first certificate based at least in part on the first certificate being unavailable (508, determination NO). It may be determined if the retrieving of the first certificate is successful at 512. If the retrieval of the first certificate is not successful (512, determination NO), then the first certificate may be removed from the neighbor list at 514 based at least in part on the retrieving being unsuccessful.

In contrast, if at 508, the first certificate associated with the largest inception time is available (508, determination YES), then the largest inception time of the first certificate may be set as the minimum trusted time at 516. Further, if at 512, the retrieving of the first certificate is successful (512, determination YES), then the largest inception time of the first certificate may be set as the minimum trusted time at 516. In one example, if other certificates that are set in the future exist in the neighbor list 404, and the nodes 106 are programmed to use them as a basis for the minimum trusted time, then the nodes 106 may be provisioned with the maximum value of the certificates into the future, and that value may be subtracted from the inception time.

Thus, via the method of FIG. 5, if the node (e.g., node 106-N) has data indicating that a first neighbor node (e.g., node 106-6) in the neighbor list 404 has a time server certificate that has a time server certificate inception time 408 of sometime in the present year (e.g., January 2022), it can be deduced that if a second neighbor node (e.g., node 106-5) has a time server certificate that has a time server certificate inception time 408 of sometime much earlier (e.g., January 2020) or if that second neighbor node (e.g., node 106-5) attempts to tell the node (e.g., node 106-N) that a current time is much earlier (e.g., January 2020), then the second neighbor node (e.g., node 106-5) is at least incorrect and may be acting maliciously. In this manner, the time server certificate inception times 408 may be used to protect the nodes 106 from malicious attacks.

Figure 6:
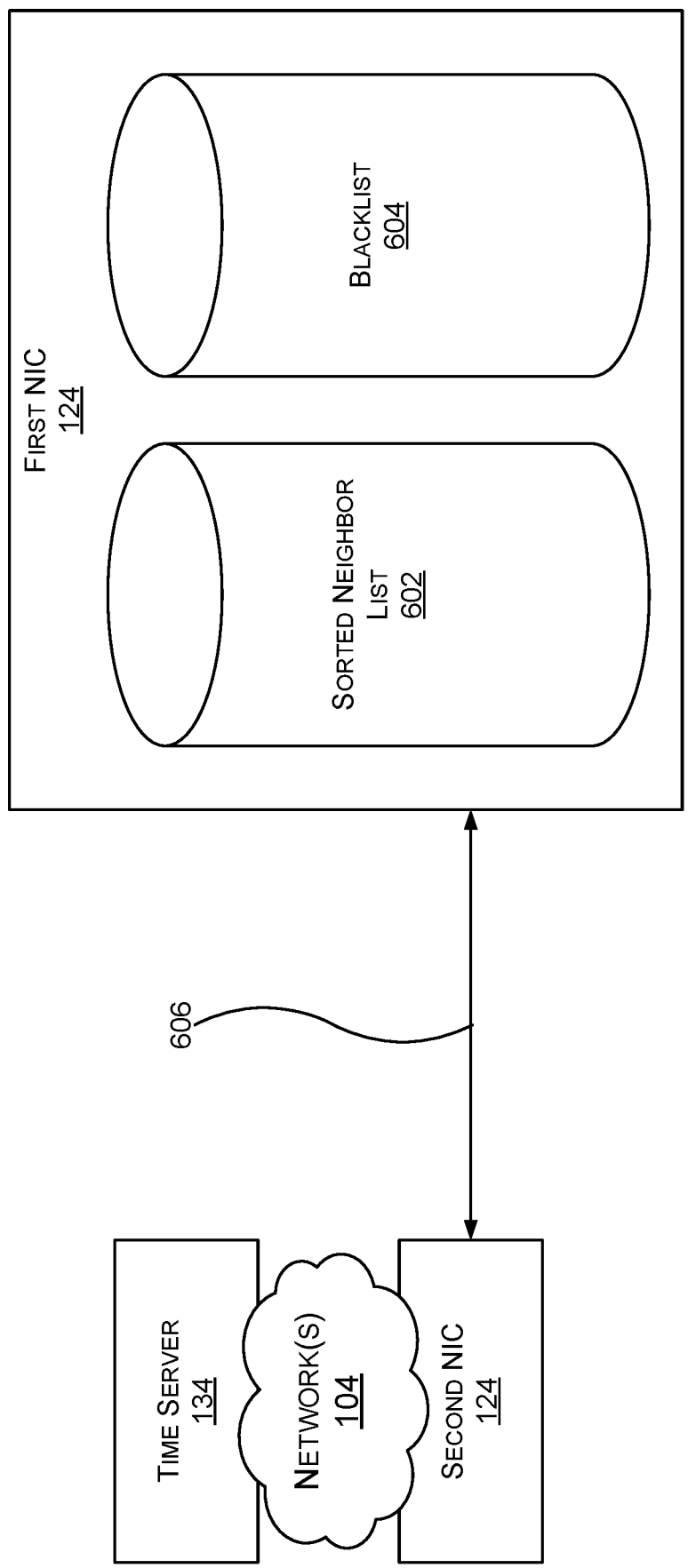
FIG. 6 is a diagram showing a NIC including a sorted neighbor list and blacklist, according to an example of the principles described herein.

Moving to FIG. 6, each NIC 124 of the nodes 106 may store two lists as depicted in FIG. 6. FIG. 6 is a diagram showing a NIC 124 including a sorted neighbor list 602 and a blacklist 604, according to an example of the principles described herein. The sorted neighbor list 602 may include a sorted list of links to neighbor nodes 106 of a particular node 106 where the sorting is based upon the method described herein in connection with the method 700 of FIG. 7. The blacklist 604 may include a number of blacklisted links where these links will not be used for time retrieval for at least a period of time. A link 606 may be used to communicate between the first NIC 124 of a first, originating node 106 to a second NIC 124 of a second, trusted node 106. As described herein, the second NIC 124 of a second, trusted node 106 may be used by the first NIC 124 of a first, originating node 106 to obtain a trusted time certificate from one of the time servers 132.

Figure 7:
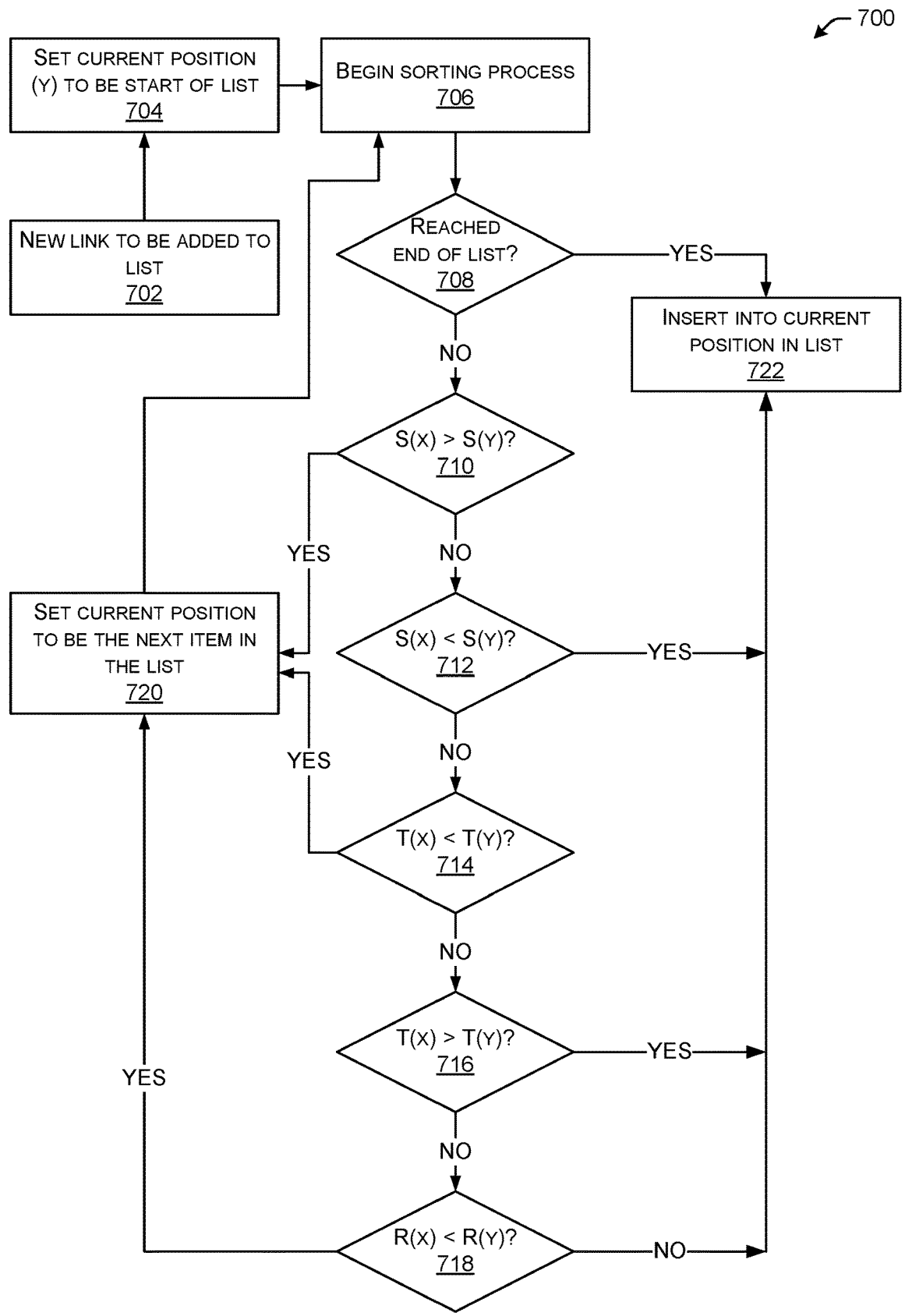
FIG. 7 illustrates a flow diagram of an example method for sorting a neighbor list, according to an example of the principles described herein.

FIG. 7 illustrates a flow diagram of an example method 700 for sorting a neighbor list 404, according to an example of the principles described herein. The sorting of the neighbor list 404 will result in the sorted neighbor list 602 of FIG. 6. As described herein, the sorting performed by the sorting module 128 may include use of a bubble sort, a quick sort, or other type of sorting algorithm to sort entries within the neighbor list based on cost values of a secure route, trust values based on certificates, cost values of a pending route, and/or other parameters.

In one example, the sorting module 128 sorts a plurality of entries within the neighbor list 404 of FIG. 4 to obtain the sorted neighbor list 602 of FIG. 6. In one example, the processes described in connection with FIG. 7 may be performed by the sorting module 128 of the node 106.

The method 700 of FIG. 7 may include, at 702, identifying a new link to be added to the sorted neighbor list 602. The new link may include any direct or indirect link between a first NIC 124 of a first, originating node 106 to one of the time servers 132, and may include at least one intermediary device (e.g., a relay device) such as a second NIC 124 of a second, trusted node 106. The new link may include a route to one of the time servers 132 and a first cost value of that route.

At 704, a current position (Y) of the new link may be set at a start of the sorted neighbor list 602 and the sorting process may be begun at 706. At 708, it may be determined if an end of the sorted neighbor list 602 has been reached. At 722, the method 700 may include inserting the new link into the current position (Y) in the sorted neighbor list 602 based at least in part on the end of the neighbor list having been reached (708, determination YES). Thus, if the new link is the only entry in the sorted neighbor list 602, then the new link will, by default, be at the top of the sorted neighbor list 602.

In contrast, based at least in part on the end of the sorted neighbor list 602 having not been reached (708, determination NO), then it may be determined, at 710 and 712, whether the first cost value S(X) for the new link is greater than or less than a second cost value S(Y) for a second link associated with the current position (Y). The method 700 may include setting the current position of the second link to be a next item in the sorted neighbor list 602 at 720 based at least in part on the first cost value S(X) for the new link being greater than the second cost value S(Y) for the second link associated with the current position (710, determination YES). If, however, the first cost value S(X) for the new link is not greater than the second cost value S(Y) for the second link associated with the current position (Y) (710, determination NO), then the method may move to 712 where it is determined whether the first cost value S(X) for the new link is less than the second cost value S(Y) for the second link associated with the current position (Y) If it is determined that the first cost value S(X) for the new link is less than the second cost value S(Y) for the second link associated with the current position (Y) (712, determination YES), then, at 722, the new link may be inserted into the current position (Y) in the sorted neighbor list 602. If, however, it is determined that the first cost value S(X) for the new link is not less than the second cost value S(Y) for the second link associated with the current position (Y) (712, determination NO), then, based on the negative determinations at 710 and 712, the first cost value S(X) for the new link is equal to the second cost value S(Y) for the second link associated with the current position (Y).

At 714, because the first cost value S(X) for the new link is equal to the second cost value S(Y) for the second link associated with the current position (Y), it may be assumed and determined that both the new link and the second link are unsecure links. Based at least in part on both the new link and the second link being unsecure links, the method 700 may further include determining whether a first trust value associated with the new link is greater than or less than a second trust value associated with the second link. Specifically, at 714, it may be determined whether the first trust value associated with the new link is less than the second trust value associated with the second link. The current position of the second link may be set to be a next item in the sorted neighbor list 602 at 720 based at least in part on the first trust value associated with the new link being less than the second trust value associated with the second link (714, determination YES). If, however, the first trust value associated with the new link is not less than the second trust value associated with the second link (714, determination NO), then the method 700 may further include determining, at 716, whether the first trust value associated with the new link is greater than the second trust value associated with the second link. If the first trust value associated with the new link is greater than the second trust value associated with the second link (716, determination YES), then the new link may be inserted into the current position in the sorted neighbor list 602 at 722. If, however, it is determined that the first trust value associated with the new link is not greater than the second trust value associated with the second link (716, determination NO), then, based on the negative determinations at 714 and 716, the first trust value associated with the new link is equal to the second trust value associated with the second link.

At 716, because the first trust value associated with the new link is equal to the second trust value associated with the second link, the method 700 may further include, at 718, determining whether a first cost value associated with the new link is greater than or less than the second cost value associated with the second link. The current position of the second link may be set at 720 to be a next item in the sorted neighbor list 602 based at least in part on the first cost value associated with the new link being less than the second cost value associated with the second link (718, determination YES). In contrast, the method 700 may include inserting the new link into the current position in the sorted neighbor list 602 at 722 based at least in part on the first cost value associated with the new link being greater than (e.g., not less than) the second cost value associated with the second link (718, determination, NO). The first trust value and the second trust value include a value that reflects a level of trust of the first link and the second link.

In one example, a trust value of 0 may be assigned if no customer certificates are associated with the first link or the second link, respectively. A trust value of 1 may be assigned if an expired customer certificate that is based on the minimum time is associated with the first link or the second link, respectively. Further, a trust value of 2 may be assigned if the customer certificates associated with the first link or the second link, respectively, passed a minimum time validation check. Thus, it may be assumed that the sorting method of FIG. 7 may generally place links with trust values of 2 higher in the sorted neighbor list 602 than links with trust values of 1, and links with trust values of 1 higher than links with trust values of 0.

Figure 8:
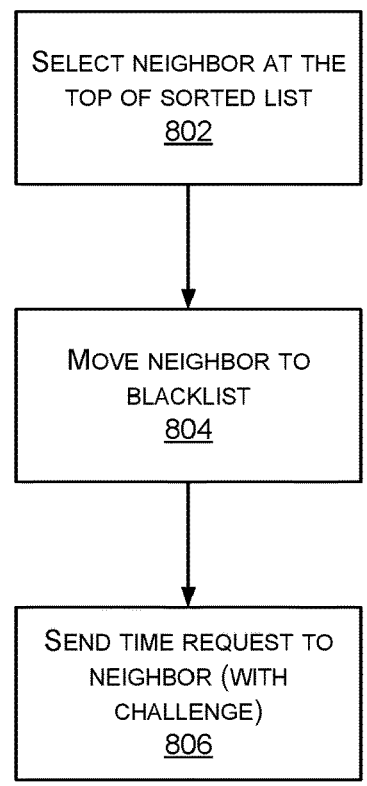
FIG. 8 illustrates a flow diagram of an example method for sending a time request to a neighbor, according to an example of the principles described herein.

FIG. 8 illustrates a flow diagram of an example method 800 for sending a time request to a neighbor node, according to an example of the principles described herein. In one example, the time request module 134 may be executed to bring about the processes of FIG. 8. Based on the sorting provided by the method 700 of FIG. 7 and the resulting sorted neighbor list 602 obtained therefrom, the method 800 of FIG. 8 may include, at 802, selecting the first neighbor device (e.g., node 106-6) at a top of the sorted neighbor list 602 as the neighbor device to which the originating node (e.g., node 106-N) may send a time request. At 804, the first neighbor device may be moved to the blacklist 604 in order to ensure that if a failure by the first neighbor device in obtaining a trusted time occurs, the first neighbor device is not used again for a period of time. This allows for a more efficient method of identifying links and routes within the network(s) 104 that will likely result in obtaining the trusted time and corresponding certificates. At 806, a first challenge (CHAL) may be sent to the first neighbor device with a time request message. In one example, the first challenge may be defined as a random sequence of bytes. In one example, the first neighbor device may respond with a hash function of the random sequence of bytes which the originating device may compare with an expected hash value. However, in the examples described herein, any type of challenge message may be used to authenticate the originating device with the first neighbor device.

Figure 9:
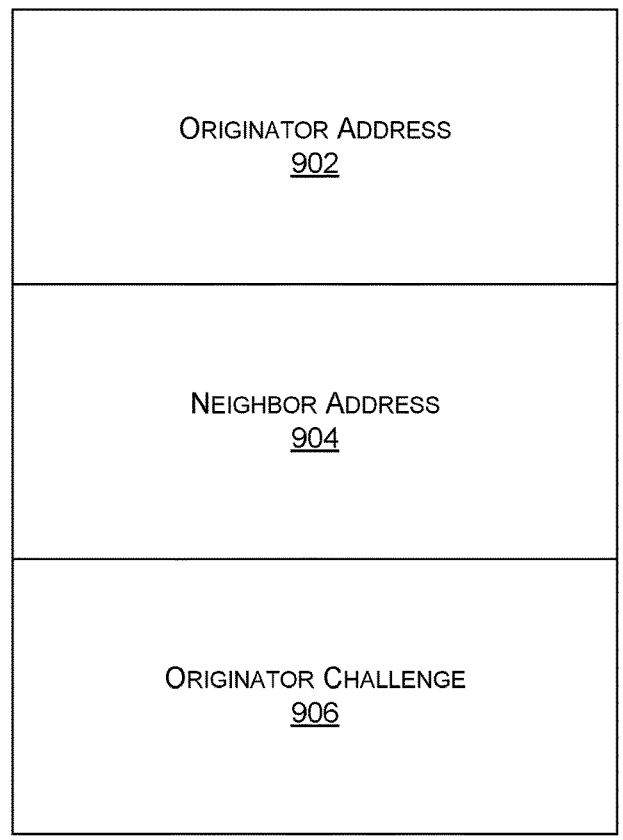
FIG. 9 is a diagram showing a time request message from an originating node, according to an example of the principles described herein.

FIG. 9 is a diagram showing a time request message 900 from an originating node, according to an example of the principles described herein. The time request message 900 may include an originator address 902 that defines, for example, an originator address 902 (e.g., media access control (MAC) address) of the originating node (e.g., node 106-N) that is seeking to obtain the trusted time. Further, the time request message 900 may include, for example, a neighbor address 904 (e.g., MAC address) of the trusted neighbor (e.g., node 106-6) from which the originating node (e.g., node 106-N) is requesting the trusted time. Still further, the time request message 900 may include the originator challenge 906 as described herein in connection with 806 of FIG. 8.

Figure 10:
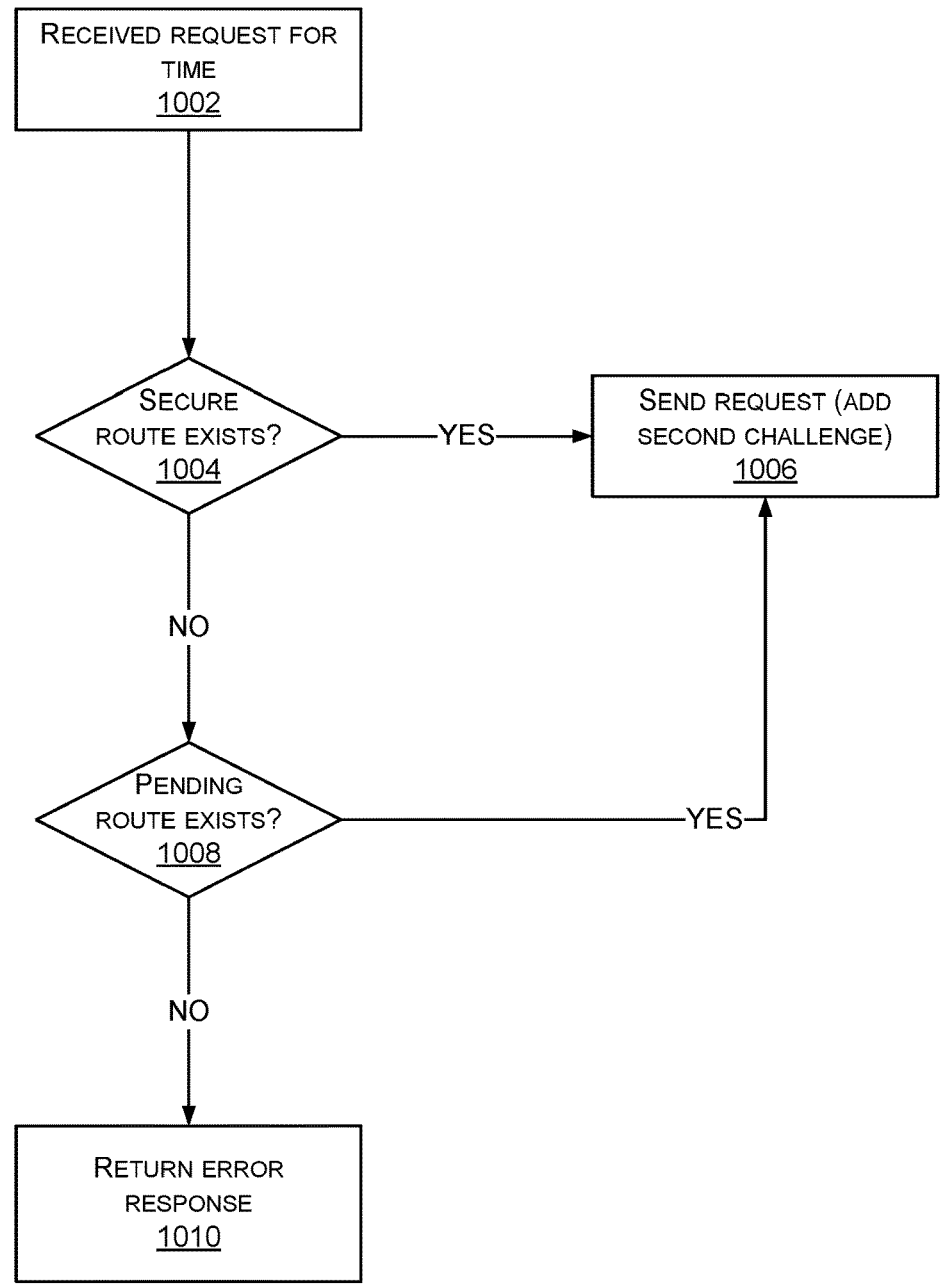
FIG. 10 illustrates a flow diagram of an example method for receiving a time request at a neighbor node from an originating node, according to an example of the principles described herein.

FIG. 10 illustrates a flow diagram of an example method 1000 for receiving a time request at a neighbor node (e.g., node 106-6) from an originating node (e.g., node 106-N), according to an example of the principles described herein. In one example, the trusted time module 126 of the neighbor node (e.g., node 106-6) may be executed to provide the processing described herein in connection with FIG. 10. The method 1000 of FIG. 10 may include, at 1002, receiving at the neighbor node (e.g., node 106-6) the time request message 900 including the originator challenge 906 (e.g., a first challenge). At 1004, it may be determined whether a secure route exists to one of the time servers 132. The method 1000 may include, at 1006, sending the time request, the first challenge, and a second challenge to the time server 132 based at least in part on the secure route to the time server existing (1004, determination YES). The second challenge added to the forwarded request is described in more detail in connection with FIG. 11.

The method 1000 may further include determining, at 1008, if a pending route to the time server exists based at least in part on the secure route to the time server not existing (1004, determination NO). The neighbor node (e.g., node 106-6) may, at 1006 send the time request, the first challenge, and a second challenge to the time server based at least in part on the pending route to the time server existing (1008, determination YES). In contrast, based at least in part on the pending route to the time server not existing (1008, determination NO), returning an error message response to the first device (e.g., node 106-N) at 1010. In one example, the neighbor node (e.g., node 106-6) may be retained on the blacklist since it is understood that the neighbor node (e.g., node 106-6) cannot provide the trusted time either directly or indirectly to the first device (e.g., node 106-N).

Thus, in FIG. 10, after the trusted neighbor node (e.g., node 106-6) receives a time request from the first device (e.g., node 106-N) to forward on to one of the time servers 132, the neighbor node (e.g., node 106-6) will use a secure route if it has one. If it does not have a secure route, it will then use a pending route. A pending route may be defined as a route which has yet to be validated. In both cases where a secure route or a pending route exists, when forwarding the time request at 1006, a new, second challenge (e.g., a random sequence of bytes) may be generated and added to the time request. Thus, the resulting time request may include two challenges: a first challenge from the originating device (e.g., node 106-N) and a second challenge from the neighbor node (e.g., node 106-6) forwarding the request. If the neighbor node (e.g., node 106-6) cannot forward the time request it will respond to the neighbor that it was of no help in assisting the originating device (e.g., node 106-N) in obtaining a trusted time.

Figure 11:
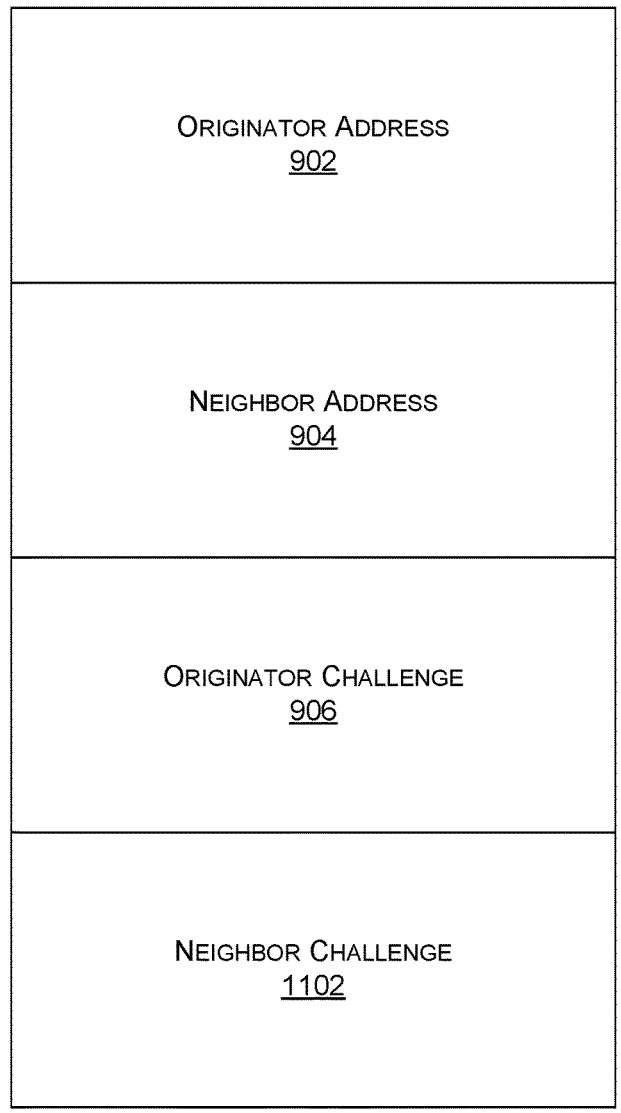
FIG. 11 is a diagram showing a time request message forwarded from a neighbor node to a time server, according to an example of the principles described herein.

FIG. 11 is a diagram showing a time request message 1100 forwarded from a neighbor node (e.g., node 106-6) to a time server 132, according to an example of the principles described herein. As mentioned above, the attributes of the time request message 1100 may be sent by the trusted neighbor node (e.g., node 106-6). The forwarded time request message 1100 may include the originator address 902 that defines, for example, an address (e.g., MAC address) of the originating node (e.g., node 106-N) that is seeking to obtain the trusted time. Further, the time request message 1100 may include, for example, the neighbor address 904 (e.g., MAC address) of the trusted neighbor (e.g., node 106-6) from which the originating node (e.g., node 106-N) is requesting the trusted time and that is to forward the time request message 1100 to the time server 132. Still further, the time request message 1100 may include the originator challenge 906 as described herein in connection with 806 of FIG. 8. The additional attribute that is added to the original message sent from the originating node (e.g., node 106-N) and forwarded by the trusted neighbor node (e.g., node 106-6) is a second challenge referred to herein as a neighbor challenge 1102. Once the neighbor challenge 1102 is added, the time request message 1100 may be sent to the time server 132 using either a secured route or unsecure route.

Figure 12:
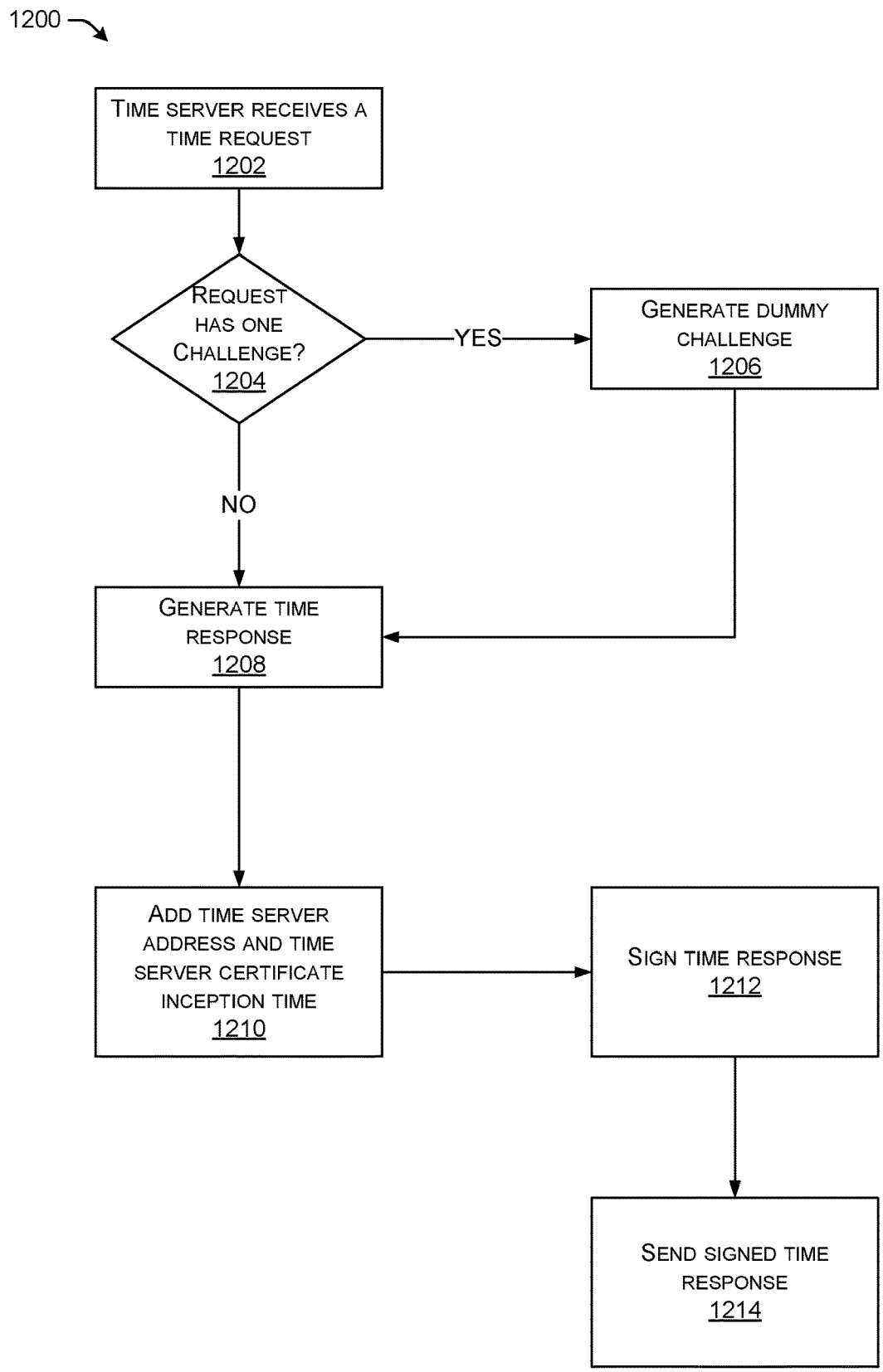
FIG. 12 illustrates a flow diagram of an example method for receiving a time request at a time server from a neighbor node, according to an example of the principles described herein.

FIG. 12 illustrates a flow diagram of an example method 1200 for receiving a time request message 900, 1100 at a time server 132 from a neighbor node (e.g., node 106-6), according to an example of the principles described herein. The method 1200 may include the time server 132 receiving the time request message 900, 1100 from the neighbor node (e.g., node 106-6) at 1202. At 1204, it may be determined whether the time request message 1100 includes one challenge (e.g., the originator challenge 906 of FIG. 9) or two challenges (e.g., the originator challenge 906 of FIG. 9 and the neighbor challenge 1102 of FIG. 11). In other words, the time server 132 may check how many challenges the time request message 900, 1100 includes.

If it is determined that the time request message 900, 1100 includes one challenge (e.g., the originator challenge 906 of FIG. 9) and not the second challenge (e.g., the neighbor challenge 1102 of FIG. 11) (1204, determination YES), the time server 132 may generate a dummy challenge at 1206. In other words, if the time request message 900, 1100 only has one, the time server 132 may determine that the request came from one of its immediate neighbor nodes 106 without any intermediate forwarding nodes 106. Thus, the time server may generate the dummy challenge to insert into a response message sent by the time server 132.

If it is determined that the time request message 900, 1100 includes two challenges (e.g., the originator challenge 906 of FIG. 9 and the neighbor challenge 1102 of FIG. 11) (1204, determination NO) or when the method 1200 proceeds from 1206, at 1208, the time server 132 may generate a time response message based at least in part on the time request message including the first challenge and the dummy challenge or the second challenge depending on whether the determination at 1204 is YES or NO. The time server 132 may generate the time response message containing the new time and information about the certificate that can be used to verify the signature. The time response message is further described herein.

At 1212, the time response message may be signed with a private key corresponding to the certificate that will be used to verify the signature. The signed data may also include the original time request message. The time response message to be sent back may not need to include the entire time request message if the contents can be obtained or calculated by the trusted neighbor node (e.g., node 106-6) and the originating node (e.g., node 106-N).

At 1214, the signed time response may be sent to the originating node (e.g., node 106-N) via the trusted neighbor node (e.g., node 106-6). In this manner, the originating node (e.g., node 106-N) may obtain the secured trusted time.

Figure 13:
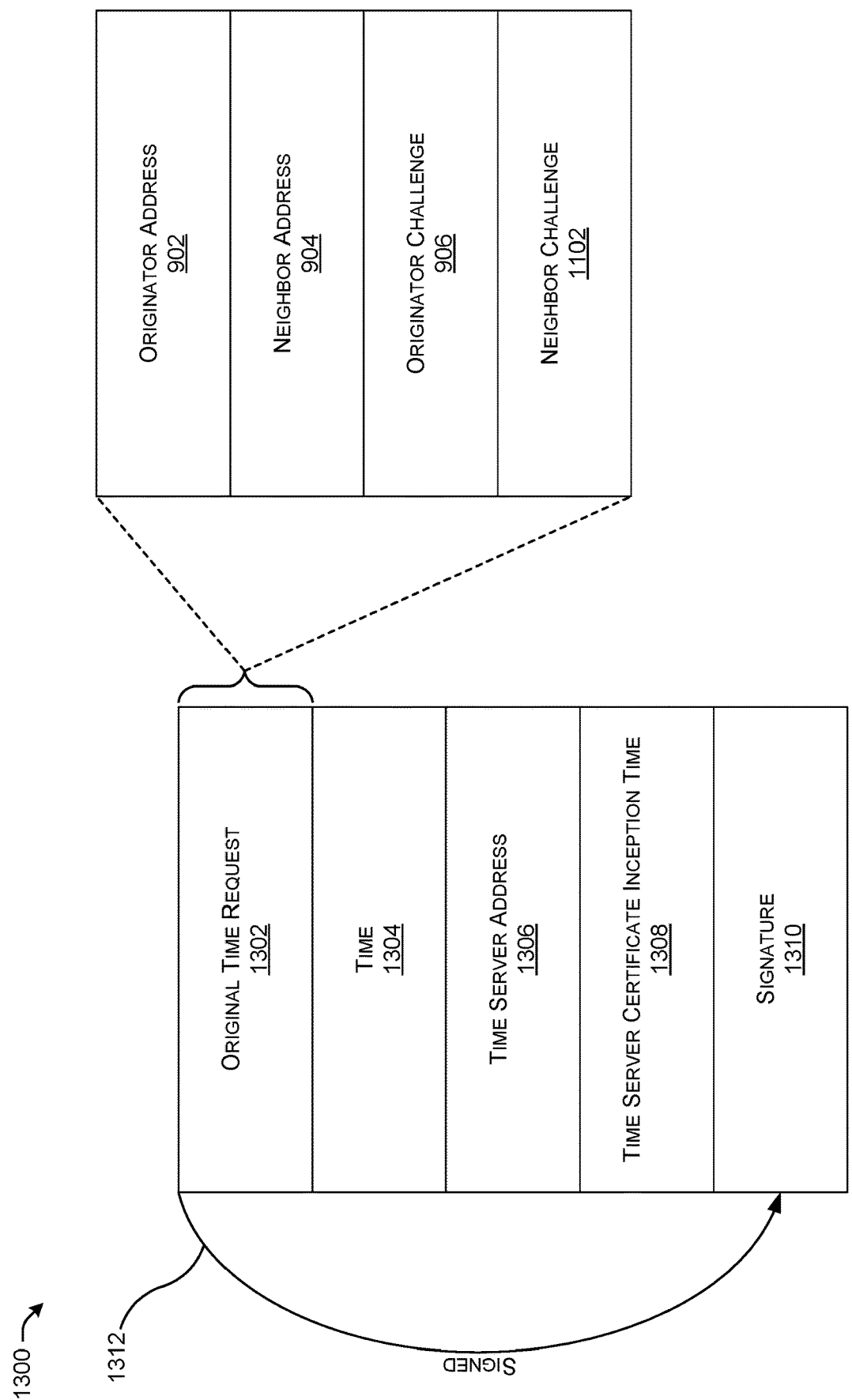
FIG. 13 is a diagram showing a time response message from a time server to a neighbor node, according to an example of the principles described herein.

FIG. 13 is a diagram showing a time response message 1300 from a time server 132 to a trusted neighbor node (e.g., node 106-6), according to an example of the principles described herein. In one example, some or all of the time request message 900, 1100 may be included within the time response message 1300. The time response message 1300 may include, for example, the original time request message 1302 (e.g., the time request message 900, 1100). Further, as indicated by 1312, the original time request message 1302 may be signed with a signature 1310 as a response to the time server certificate signing request (CSR) created at 306 of FIG. 3 and sent to the time server 132 for signature. The original time request message 1302 (e.g., the time request message 900, 1100) may include originator address 902, the neighbor address 904, the originator challenge 906, the neighbor challenge 1102, and combinations thereof.

Still further, the time response message 1300 may include the actual time attribute 1304 to allow devices within the network(s) 104 such as the nodes 106 to synchronize their network times. A time server address 1306 (e.g., a MAC address) of the time server 132 and a time server certificate inception time 1308 associated with the time server address 1306 may also be included in the time response message 1300.

In one example, any portion or attribute of the original time request message 1302 may not need to be sent over the network(s) if the nodes 106 within network(s) 104 can obtain or calculate those portions or attributes by other means. However, the time response message 1300 does contain the time attribute 1304 to allow the nodes 106 to synchronize their network times, the time server address 1306, and the time server certificate inception time 1308.

Figure 14:
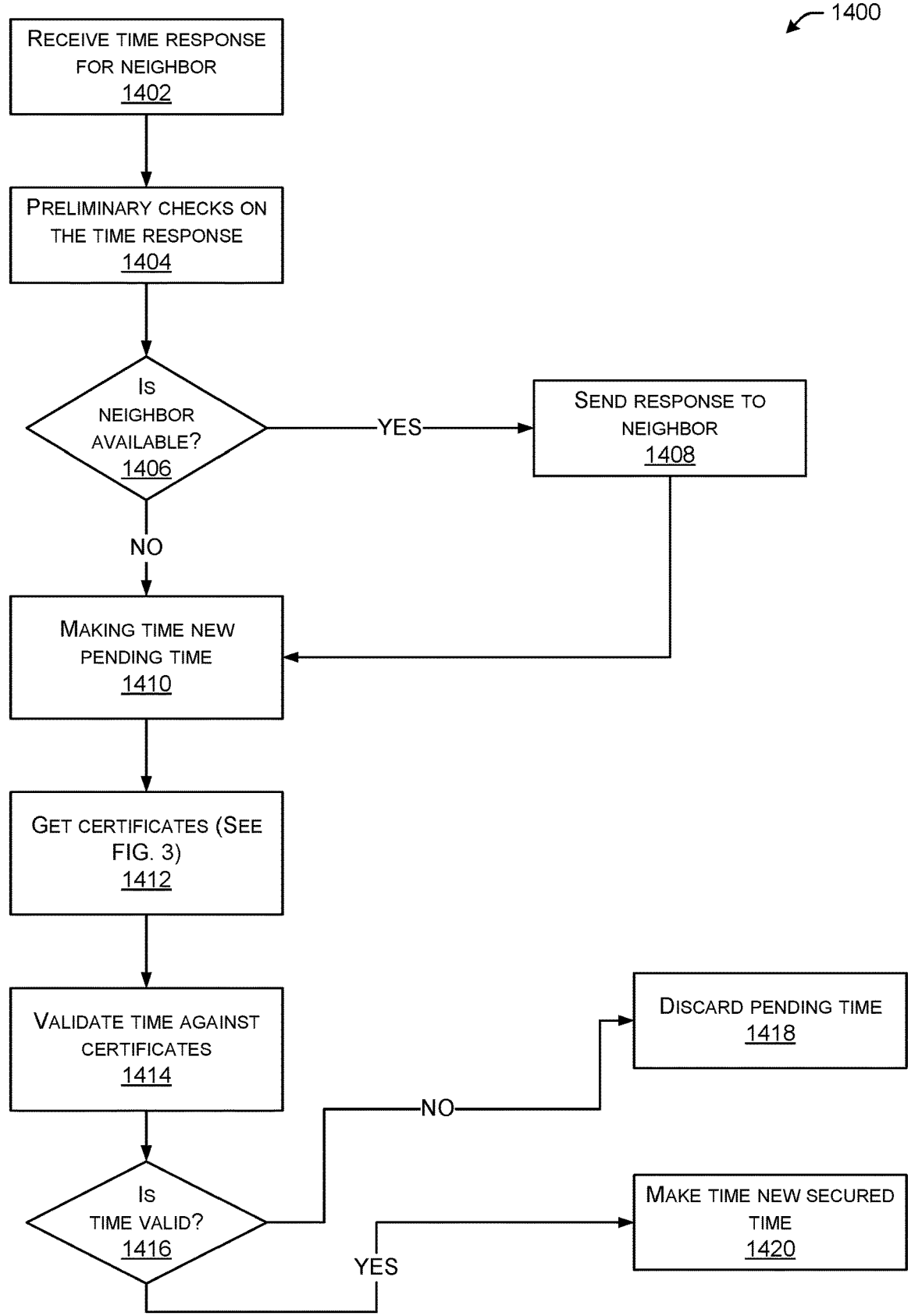
FIG. 14 illustrates a flow diagram of an example method for receiving a time response at a NIC of a trusted neighbor node, according to an example of the principles described herein.

FIG. 14 illustrates a flow diagram of an example method 1400 for receiving a time response message 1300 at a NIC 124 of a trusted neighbor node (e.g., node 106-6), according to an example of the principles described herein. At 1402, the time response message 1300 may be received by the time server 132 in order to prepare to send the time response message 1300 to the trusted neighbor node (e.g., node 106-6). At 1404, a preliminary check on the time response message 1300 may be performed. In one example, the time response message 1300 may have been received by the trusted neighbor node (e.g., node 106-6) over an unsecure route or link. The preliminary check performed at 1404 may be performed on the time response message 1300 before forwarding the time response message 1300 onto the trusted neighbor node (e.g., node 106-6). For example, as part of the preliminary check performed at 1404, the time server 132 may determine if the time attribute 1304 meets the minimum time requirements as determined at FIG. 5. Further, as part of the preliminary check performed at 1404, the time server 132 may determine if the originator challenge 906 of FIG. 9 and/or the neighbor challenge 1102 of FIG. 11 are correct via the use of public and private key pairs 304. Still further, as part of the preliminary check performed at 1404, the time server 132 may determine if the number of hops to the time server 132 is below a maximum number. As part of the preliminary check performed at 1404, the time server 132 may further determine if an interval and/or drift of time in each intermediary device between the time server 132 and the originating node (e.g., node 106-N) is within a predetermined threshold range or within some type of appropriate range.

At 1406, the time server 132 may determine if the trusted neighbor node (e.g., node 106-6) is available. If the trusted neighbor node (e.g., node 106-6) is available (1406, determination YES), then at 1408 the time response message 1300 may be sent to the trusted neighbor node (e.g., node 106-6), and, specifically, the NIC 124 of the trusted neighbor node (e.g., node 106-6). If the trusted neighbor node (e.g., node 106-6) is not available (1406, determination NO), then a time attribute 1304 defined by the time response message 1300 may be assigned as a pending time at 1410. At 1412, the trusted neighbor node (e.g., node 106-6) may obtain at least one certificate from the time response message 1300. The trusted neighbor node (e.g., node 106-6) may validate the time attribute 1304 against the at least one certificate at 1414.

At 1416, the trusted neighbor node (e.g., node 106-6) executing, for example, the trusted time module 126, may determine whether the time attribute 1304 is valid based on the certificates obtained and used for validation at 1412 and 1414. If the time attribute 1304 is not valid (1416, determination NO), then the pending time may be discarded at 1418. In contrast, if the time attribute 1304 is valid (1416, determination YES), the trusted neighbor node (e.g., node 106-6) may assign the time defined by the time attribute 1304 as a secured time at 1420. Thus, after the time server 132 attempts to forward the time response message 1300 onto the trusted neighbor node (e.g., node 106-6), the time server 132 may make the time it was provided the pending time. The trusted neighbor node (e.g., node 106-6) may then obtain the certificates that are required to validate the time response message 1300. If the time response message 1300 is valid, then the trusted neighbor node (e.g., node 106-6) may change the pending time to be the new secured time. If the time response message 1300 is not valid, then the trusted neighbor node (e.g., node 106-6) will discard the time attribute 1304.

Figure 15:
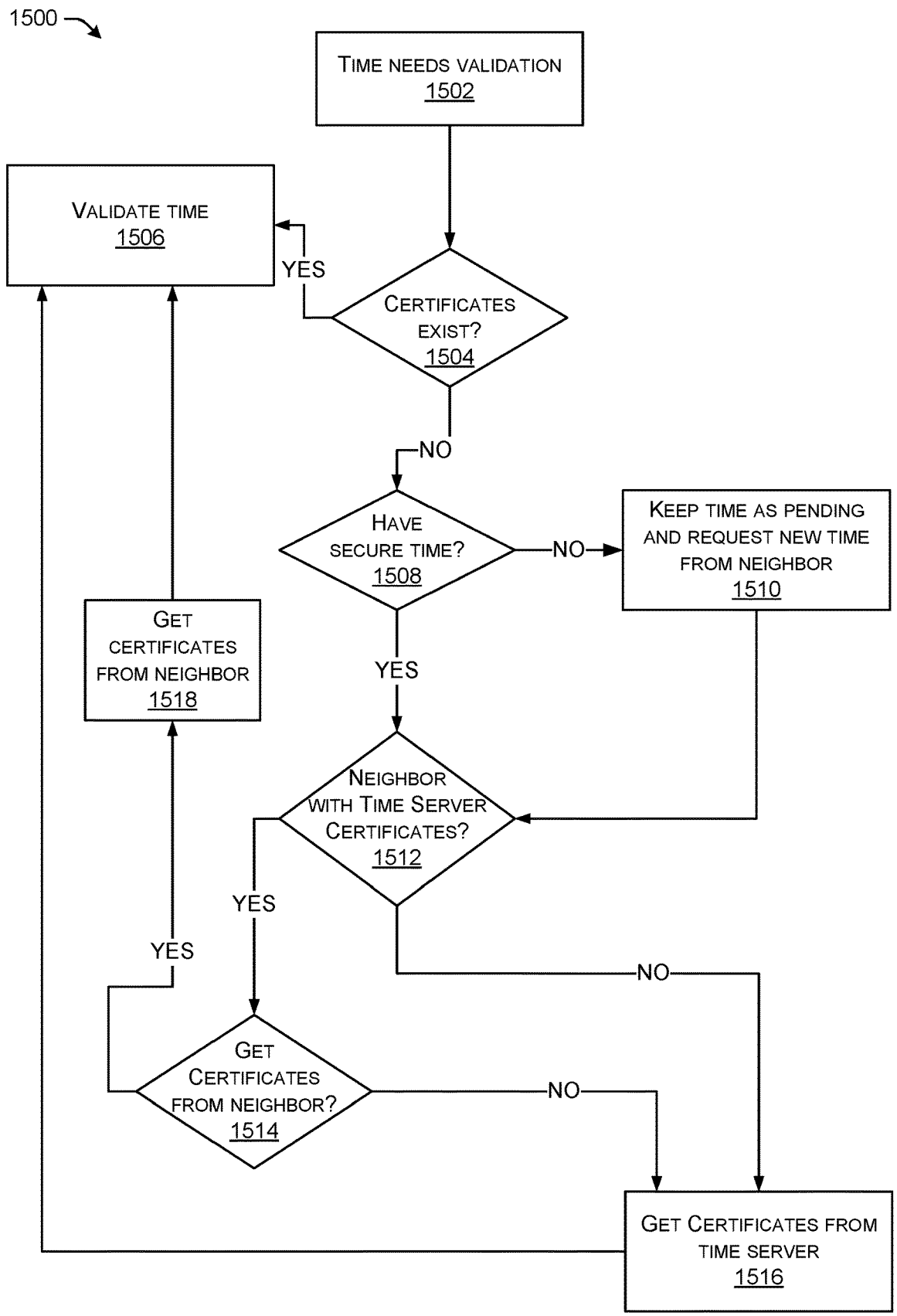
FIG. 15 illustrates a flow diagram of an example method for a neighbor node receiving certificates from a time server, according to an example of the principles described herein.

FIG. 15 illustrates a flow diagram of an example method 1500 for a neighbor node (e.g., node 106-6) receiving certificates (e.g., the time server certificate) from a time server 132, according to an example of the principles described herein. To validate the time attribute 1304 against the at least one certificate at 1502, the method 1500 may include, at 1504, determining whether certificates exist in a first local storage of the neighbor node (e.g., node 106-6) such as in, for example, the certificate database 402. The method 1500 may further include validating the time attribute 1304 at 1506 based at least in part on the certificate existing in the first local storage of the neighbor node (e.g., node 106-6) (1504, determination YES).

If, however, the certificate does not exist in the first local storage of the neighbor node (e.g., node 106-6) (1504, determination NO), the method 1500 may further include determining whether the neighbor node (e.g., node 106-6) has the secured time attribute 1304 at 1508. If the neighbor node (e.g., node 106-6) does not have the secured time (1508, determination NO), the neighbor node (e.g., node 106-6) may identify the time attribute 1304 as the pending time and request a new time from a second neighbor node (e.g., node 106-5) or the time server 132. If the neighbor node (e.g., node 106-6) does have the secured time (1508, determination YES), then it may be determined whether the neighbor node (e.g., node 106-6) has the time server certificate at 1512. Further, once the processing of 1510 is complete, the method 1500 may proceed to 1512 as described above.

If the neighbor node (e.g., node 106-6) does not have the time server certificate at 1512, the time server certificate may be obtained from the time server 132 at 1516. If, however, the neighbor node (e.g., node 106-6) does have the time server certificate at 1512, a determination may be made at 1514 as to whether the time server certificate should be obtained from the neighbor node (e.g., node 106-6). If the time server certificate should not be obtained from the neighbor node (e.g., node 106-6), then the time server certificate may be obtained from the time server 132 at 1516. If, instead, the time server certificate should be obtained from the neighbor node (e.g., node 106-6), then the time server certificate may be obtained from the neighbor node (e.g., node 106-6) at 1518. In all instances where the certificates are obtained such as at 1516 and 1518, the method 1500 may further include validating the time attribute 1304 at 1506.

Thus, FIG. 15 demonstrates how the trusted neighbor node (e.g., node 106-6) may obtain the time server certificates when it validates the time response message 1300. If the certificates exist in the local storage of the neighbor node (e.g., node 106-6), the neighbor node (e.g., node 106-6) will use those stored certificates. Certificates that are in local storage may have been validated previously and do not require further validation. If the certificates do not exist in the local storage of the neighbor node (e.g., node 106-6), then the neighbor node (e.g., node 106-6) may check if the neighbor node (e.g., node 106-6) already has secure time. If the neighbor node (e.g., node 106-6) already has secure time, then the neighbor node (e.g., node 106-6) may obtain the new certificates from its neighbors or directly from the time server 132. If the neighbor node (e.g., node 106-6) does not have secure time, then the neighbor node (e.g., node 106-6) may attempt to get secure time by sending a time request to a trusted neighbor of its own.

Figure 16:
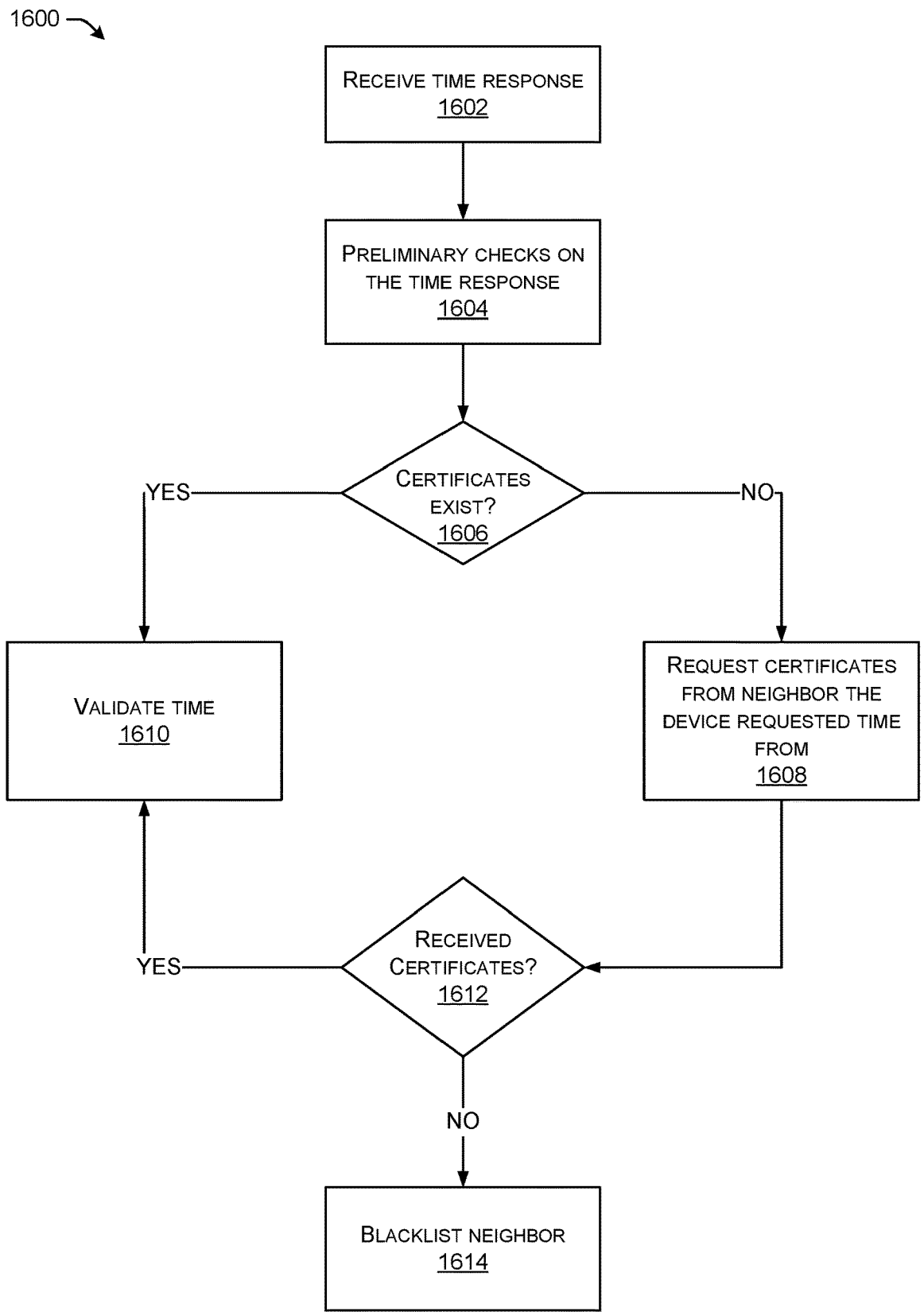
FIG. 16 illustrates a flow diagram of an example method for receiving a time response at an originating node, according to an example of the principles described herein.

FIG. 16 illustrates a flow diagram of an example method 1600 for receiving a time response message 1300 at an originating device (e.g., node 106-N), according to an example of the principles described herein. At 1602, the originating device (e.g., node 106-N) may receive the time response message 1300 at its NIC 124 and from the neighbor node (e.g., node 106-6). The originating device (e.g., node 106-N) may perform a preliminary check on the time response message 1300 at 1604. In one example, the time response message 1300 may have been received by the originating device (e.g., node 106-N) over an unsecure route or link. The preliminary check performed at 1604 may be performed on the time response message 1300. As part of the preliminary check performed at 1604, the originating device (e.g., node 106-N) may determine if the originator challenge 906 and/or the neighbor challenge 1102 is correct, if the time attribute 1304 is greater than the minimal time determined at FIG. 5, perform other types of checks, and combinations thereof.

At 1606, it may be determined whether the certificate exists in a local storage of the originating device (e.g., node 106-N). If the certificate does not exist in a local storage of the originating device (e.g., node 106-N) (1606, determination NO), then the originating device (e.g., node 106-N) may request the certificate from the neighbor node (e.g., node 106-6) at 1608. At 1610, the time attribute 1304 may be validated if the certificate does exist in a local storage of the originating device (e.g., node 106-N) (1606, determination YES).

At 1612, it may be determined whether the certificate is received from the neighbor node (e.g., node 106-6). If the certificate has been received from the neighbor node (e.g., node 106-6) (1612, determination YES), then, at 1610, the time attribute 1304 may be validated.

However, if the certificate has not been received from the neighbor node (e.g., node 106-6) (1612, determination NO), then the neighbor node (e.g., node 106-6) may be blacklisted at 1614. Thus, the time attribute 1304 may be validated based at least in part on the certificate being received from the neighbor node (e.g., node 106-6) or based at least in part on the certificate existing in the local storage of the originating device (e.g., node 106-N).

Figure 17:
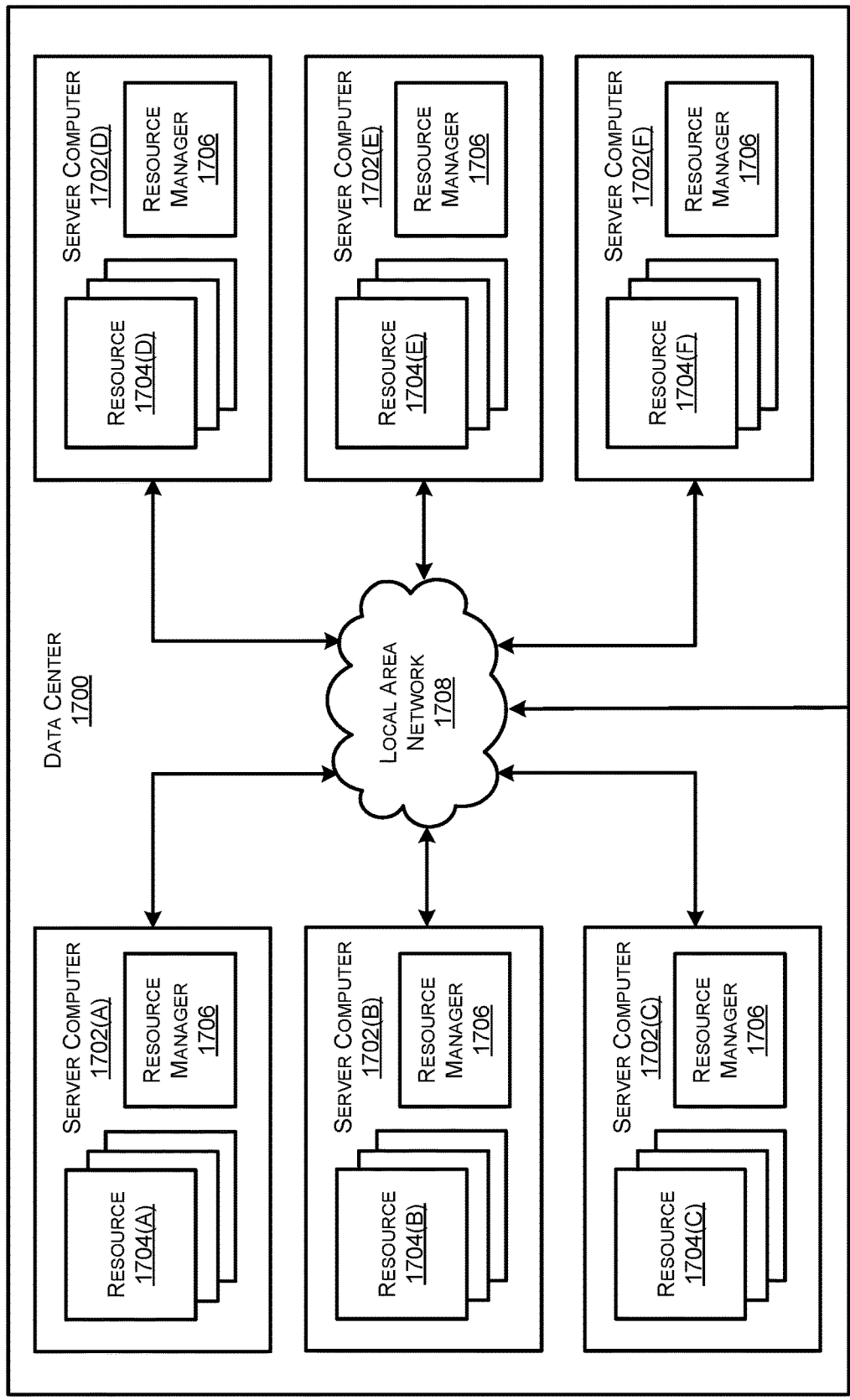
FIG. 17 illustrates a computing system diagram illustrating a configuration for a data center that may be utilized to implement aspects of the technologies disclosed herein.

FIG. 17 illustrates a computing system diagram illustrating a configuration for a data center 1700 that may be utilized to implement aspects of the technologies disclosed herein. The example data center 1700 shown in FIG. 17 includes several server computers 1702A-1702F (which might be referred to herein singularly as "a server computer 1702" or in the plural as "the server computers 1702) for providing computing resources. In some examples, the resources and/or server computers 1702 may include, or correspond to, any type of networked device described herein. Although described as servers, the server computers 1702 may include any type of networked device, such as servers, switches, routers, hubs, bridges, gateways, modems, repeaters, access points, etc.

The server computers 1702 may be standard tower, rack-mount, or blade server computers configured appropriately for providing computing resources. In some examples, the server computers 1702 may provide computing resources 1704 including data processing resources such as VM instances or hardware computing systems, database clusters, computing clusters, storage clusters, data storage resources, database resources, networking resources, virtual private networks (VPNs), and others. Some of the server computers 1702 may also be configured to execute a resource manager 1706 capable of instantiating and/or managing the computing resources. In the case of VM instances, for example, the resource manager 1706 may be a hypervisor or another type of program configured to enable the execution of multiple VM instances on a single server computer 1702. Server computers 1702 in the data center 1700 may also be configured to provide network services and other types of services.

In the example data center 1700 shown in FIG. 17, an appropriate LAN 1708 is also utilized to interconnect the server computers 1702A-1702F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 1700, between each of the server computers 1702A-1702F in each data center 1700, and, potentially, between computing resources in each of the server computers 1702. It may be appreciated that the configuration of the data center 1700 described with reference to FIG. 17 is merely illustrative and that other implementations may be utilized.

In some examples, the server computers 1702 and or the computing resources 1704 may each execute/host one or more tenant containers and/or virtual machines to perform techniques described herein.

In some instances, the data center 1700 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 1704 provided by the cloud computing network may include various types of computing resources, such as data processing resources like tenant containers and VM instances, data storage resources, networking resources, data communication resources, network services, VPN instances, and the like.

Each type of computing resource 1704 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 1704 not mentioned specifically herein.

The computing resources 1704 provided by a cloud computing network may be enabled in one example by one or more data centers 1700 (which might be referred to herein singularly as "a data center 1700" or in the plural as "the data centers 1700"). The data centers 1700 are facilities utilized to house and operate computer systems and associated components.

The data centers 1700 typically include redundant and backup power, communications, cooling, and security systems. The data centers 1700 may also be located in geographically disparate locations. One illustrative example for a data center 1700 that may be utilized to implement the technologies disclosed herein is described herein with regard to, for example, FIGS. 1 through 16.

Figure 18:
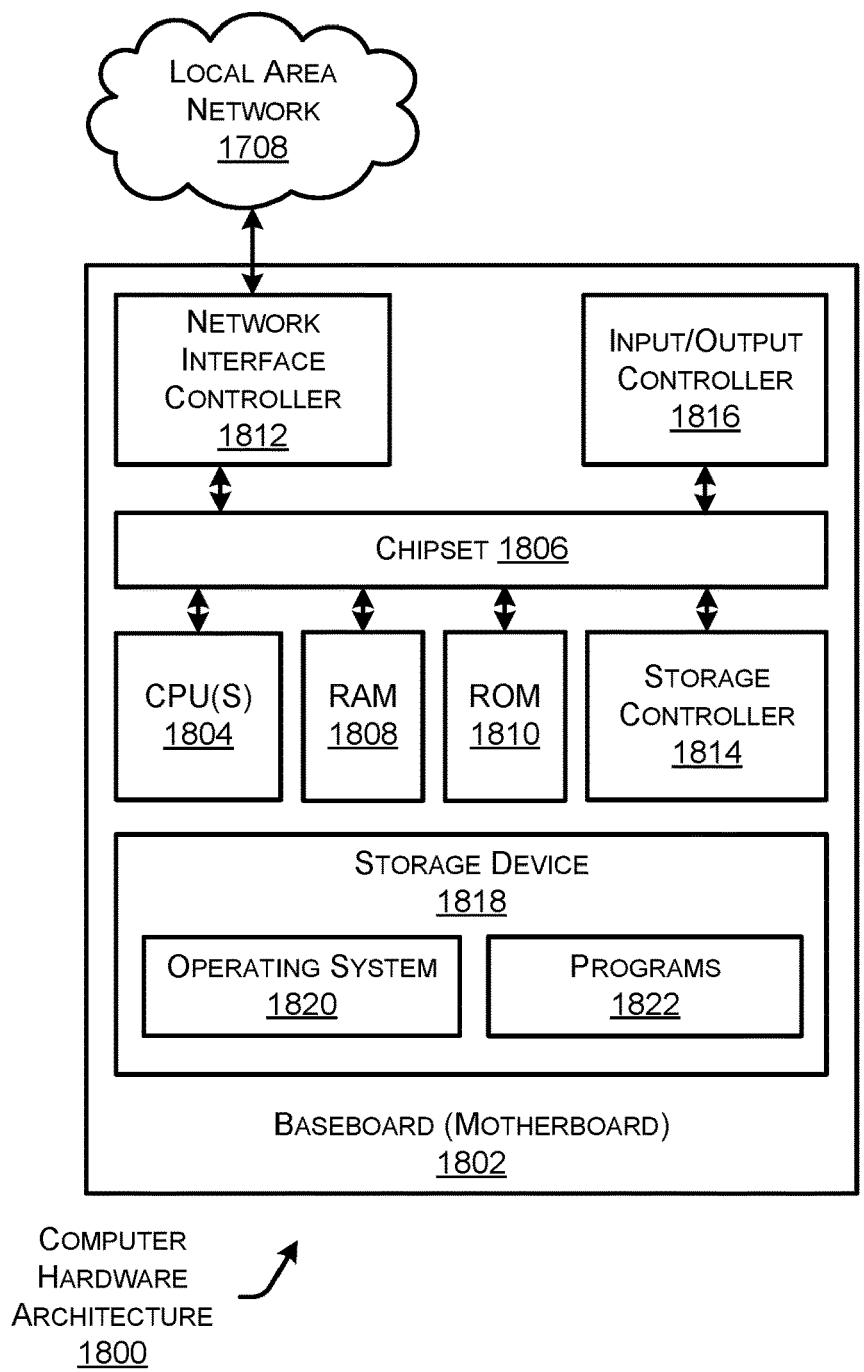
FIG. 18 illustrates a computer architecture diagram showing an example computer hardware architecture for implementing a computing device that may be utilized to implement aspects of the various technologies presented herein.

FIG. 18 illustrates a computer architecture diagram showing an example computer hardware architecture 1800 for implementing a computing device that may be utilized to implement aspects of the various technologies presented herein. The computer hardware architecture 1800 shown in FIG. 18 illustrates the network architecture 100, the central office 102, the NTP server 130, the time server(s) 132, the network(s) 104, the node(s) 106, and/or other systems or devices associated with the network architecture 100 and/or remote from the network architecture 100, a workstation, a desktop computer, a laptop, a tablet, a network appliance, an e-reader, a smartphone, or other computing device, and may be utilized to execute any of the software components described herein. The computer 1800 may, in some examples, correspond to a network device (e.g., the central office 102, the NTP server 130, the time server(s) 132, the network(s) 104, the node(s) 106 described herein, and may include networked devices such as servers, switches, routers, hubs, bridges, gateways, modems, repeaters, access points, etc.

The computer 1800 includes a baseboard 1802, or "motherboard," which is a printed circuit board to which a multitude of components or devices may be connected by way of a system bus or other electrical communication paths. In one illustrative configuration, one or more central processing units (CPUs) 1804 operate in conjunction with a chipset 1806. The CPUs 1804 may be standard programmable processors that perform arithmetic and logical operations necessary for the operation of the computer 1800.

The CPUs 1804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1806 provides an interface between the CPUs 1804 and the remainder of the components and devices on the baseboard 1802. The chipset 1806 may provide an interface to a RAM 1808, used as the main memory in the computer 1800. The chipset 1806 may further provide an interface to a computer-readable storage medium such as a read-only memory (ROM) 1810 or non-volatile RAM (NVRAM) for storing basic routines that help to startup the computer 1800 and to transfer information between the various components and devices. The ROM 1810 or NVRAM may also store other software components necessary for the operation of the computer 1800 in accordance with the configurations described herein.

The computer 1800 may operate in a networked environment using logical connections to remote computing devices and computer systems through a network, such as the network architecture 100, the central office 102, the NTP server 130, the time server(s) 132, the network(s) 104, the node(s) 106, among other devices. The chipset 1806 may include functionality for providing network connectivity through a Network Interface Controller (NIC) 1812, such as a gigabit Ethernet adapter. The NIC 1812 is capable of connecting the computer 1800 to other computing devices within the network architecture 100 and external to the network architecture 100. It may be appreciated that multiple NICs 1812 may be present in the computer 1800, connecting the computer to other types of networks and remote computer systems. In some examples, the NIC 1812 may be configured to perform at least some of the techniques described herein, such as packet redirects and/or other techniques described herein.

The computer 1800 may be connected to a storage device 1818 that provides non-volatile storage for the computer. The storage device 1818 may store an operating system 1820, programs 1822 (e.g., any computer-readable and/or computer-executable code described herein), and data, which have been described in greater detail herein. The storage device 1818 may be connected to the computer 1800 through a storage controller 1814 connected to the chipset 1806. The storage device 1818 may consist of one or more physical storage units. The storage controller 1814 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 1800 may store data on the storage device 1818 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 1818 is characterized as primary or secondary storage, and the like.

For example, the computer 1800 may store information to the storage device 1818 by issuing instructions through the storage controller 1814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description.

The computer 1800 may further read information from the storage device 1818 by detecting the physical states or characteristics of one or more particular locations within the physical storage units.

In addition to the storage device 1818 described above, the computer 1800 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 1800. In some examples, the operations performed by the network architecture 100, the central office 102, the NTP server 130, the time server(s) 132, the network(s) 104, the node(s) 106, and/or any components included therein, may be supported by one or more devices similar to computer 1800. Stated otherwise, some or all of the operations performed by the network architecture 100, the central office 102, the NTP server 130, the time server(s) 132, the network(s) 104, the node(s) 106, and/or any components included therein, may be performed by one or more computer devices operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 1818 may store an operating system 1820 utilized to control the operation of the computer 1800. According to one example, the operating system 1820 may include the LINUX operating system. According to another example, the operating system may include the WINDOWS® SERVER operating system from MICROSOFT Corporation of Redmond, Washington. According to further examples, the operating system may include the UNIX operating system or one of its variants. It may be appreciated that other operating systems may also be utilized. The storage device 1818 may store other system or application programs and data utilized by the computer 1800.

In one example, the storage device 1818 or other computer-readable storage media is encoded with computer-executable instructions which, when loaded into the computer 1800, transform the computer from a general-purpose computing system into a special-purpose computer capable of implementing the examples described herein. These computer-executable instructions transform the computer 1800 by specifying how the CPUs 1804 transition between states, as described above. According to one example, the computer 1800 has access to computer-readable storage media storing computer-executable instructions which, when executed by the computer 1800, perform the various processes described above with regard to FIGS. 1 through 17. The computer 1800 may also include computer-readable storage media having instructions stored thereupon for performing any of the other computer-implemented operations described herein.

The computer 1800 may also include one or more input/output controllers 1816 for receiving and processing input from a number of input devices, such as a keyboard, a mouse, a touchpad, a touch screen, an electronic stylus, or other type of input device. Similarly, an input/output controller 1816 may provide output to a display, such as a computer monitor, a flat-panel display, a digital projector, a printer, or other type of output device. It will be appreciated that the computer 1800 might not include all of the components shown in FIG. 18, may include other components that are not explicitly shown in FIG. 18, or might utilize an architecture completely different than that shown in FIG. 18.

As described herein, the computer 1800 may include one or more of the network architecture 100, the central office 102, the NTP server 130, the time server(s) 132, the network(s) 104, the node(s) 106, and/or other systems or devices associated with the network architecture 100 and/or remote from the network architecture 100. The computer 1800 may include one or more hardware processor(s) such as the CPUs 1804 configured to execute one or more stored instructions. The CPUs 1804 may include one or more cores. Further, the computer 1800 may include one or more network interfaces configured to provide communications between the computer 1800 and other devices, such as the communications described herein as being performed by the network architecture 100, the central office 102, the NTP server 130, the time server(s) 132, the network(s) 104, the node(s) 106, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 1822 may include any type of programs or processes to perform the techniques described in this disclosure for the network architecture 100, the central office 102, the NTP server 130, the time server(s) 132, the network(s) 104, and/or the node(s) 106 as described herein. The programs 1822 may enable the devices described herein to perform various operations.

Figure 19:
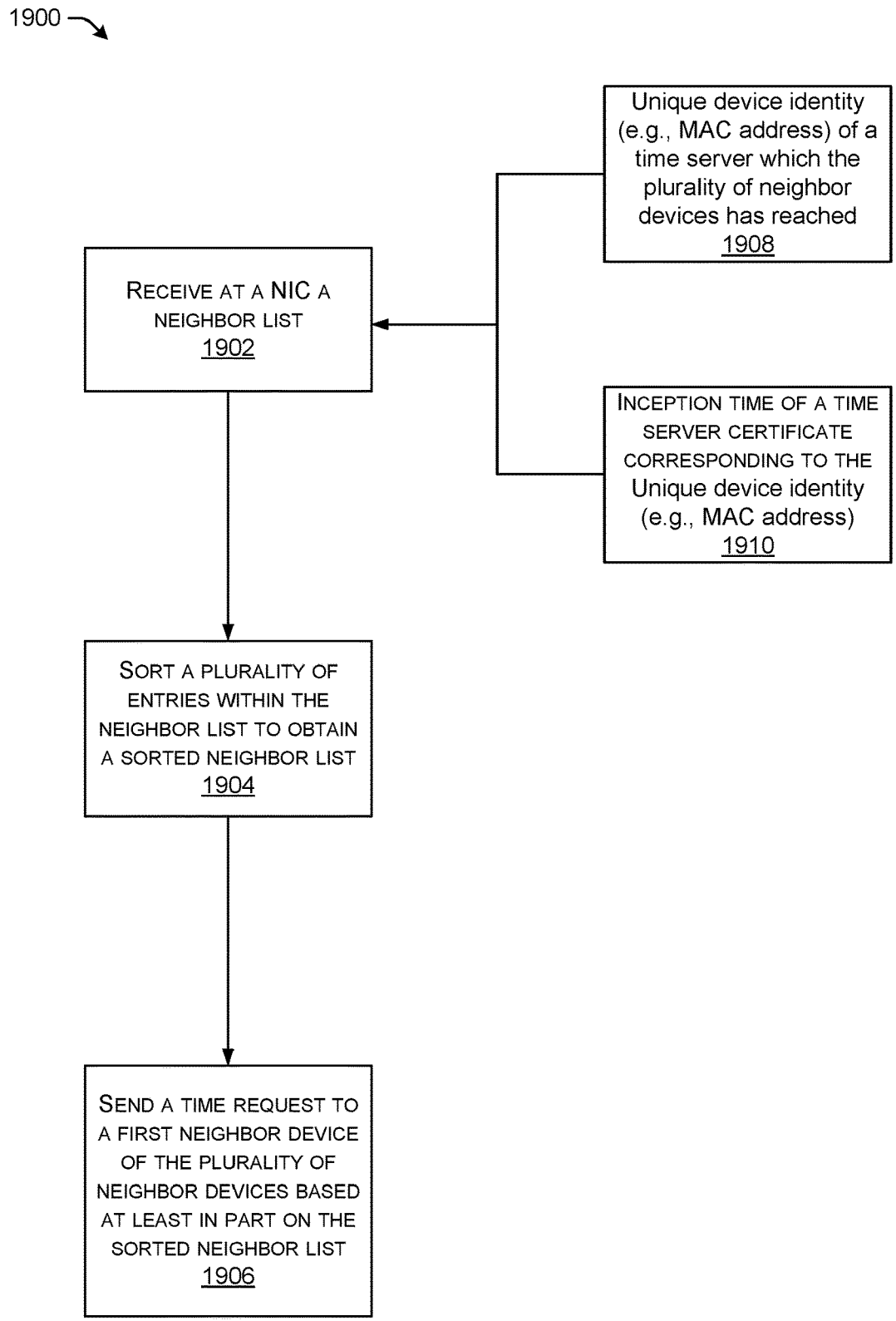
FIG. 19 illustrates a flow diagram of an example method for securely providing a trusted time, according to an example of the principles described herein.

FIG. 19 illustrates a flow diagram of an example method 1900 for securely providing a trusted time, according to an example of the principles described herein. The method 1900 may include receiving at a network interface controller (NIC) a neighbor list including a plurality of entries for a corresponding plurality of neighbor devices at 1902. As indicated at 1908 and 1910, each of the plurality of entries may include a unique device identity (e.g., MAC address) of a time server which the plurality of neighbor devices has reached, and an inception time of a time server certificate corresponding to the unique device identity (e.g., MAC address).

At 1904, the method 1900 may further include sorting the plurality of entries within the neighbor list to obtain a sorted neighbor list. At 1906, a time request may be sent to a first neighbor device of the plurality of neighbor devices based at least in part on the sorted neighbor list.

CONCLUSION

The examples described herein provide for heterogenous computing devices ranging in security abilities in a mesh network to obtain time efficiently and securely. The most secured computing devices in the network (e.g., a mesh network) may include a number of time servers acting as the source of time for the network. The present disclosure may further address instances where computing devices in an area may all be powered off due to blackouts, and then restarted at the same time. Further, the present disclosure may further address instances where routing a time request message may have different algorithms compared to choosing a best neighbor to request secure time.

The present disclosure may further address instances where tentative or pending routes may exist before the routes are considered secured, and allows for the use of a pending route to a time server to get time. Further, the present disclosure may further provide for the use of a minimum time in order to obtain some validation of security links and routes before secure time is obtained. Still further, the present disclosure may further provide an efficient mechanism to obtain time server certificates to validate time, and, therefore, place less load on the network. The present disclosure may further stop the time from being set to a value well in the past from a compromised time server since the time servers are secured.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example(s) chosen for purposes of disclosure, and cover all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A method of securely providing a trusted time comprising:
receiving at a network interface controller (NIC) a neighbor list comprising a plurality of entries for a corresponding plurality of neighbor devices wherein each of the plurality of entries comprises:
a unique device identity of a time server which the plurality of neighbor devices has reached; and
an inception time of a time server certificate corresponding to the unique device identity;
sorting the plurality of entries within the neighbor list to obtain a sorted neighbor list; and
sending a time request to a first neighbor device of the plurality of neighbor devices based at least in part on the sorted neighbor list.

2. The method of claim 1, further comprising determining a minimum time to at least temporarily validate time for the NIC, the minimum time being determined by:
obtaining the minimum time from a local storage of the first device based at least in part on the first device having no time;
identifying, for each of a plurality of certificates, a largest inception time; and
setting the minimum time based at least in part on a first certificate being available.

3. The method of claim 2, further comprising:
receiving, at the first device, a time response from the first neighbor device;
performing a preliminary check on the time response;
determining whether the certificate exists in a local storage of the first device;
requesting the certificate from the first neighbor device based at least in part on the certificate not existing in the local storage of the first device;
determining whether the certificate is received from the first neighbor device;
blacklisting the first neighbor device based at least in part on the certificate not being received from the first neighbor device;
validating the time based at least in part on the certificate being received from the first neighbor device; and
validating the time based at least in part on the certificate existing in the local storage of the first device.

4. The method of claim 1, wherein the sorting of the plurality of entries within the neighbor list to obtain the sorted neighbor list comprises:
identifying a new link to be added to the sorted neighbor list, the new link comprising:
a route to the time server; and
a first cost value of the route;
setting a current position of the new link at a start of the sorted neighbor list;
determining if an end of the sorted neighbor list has been reached;
inserting the new link into the current position in the sorted neighbor list based at least in part on the end of the neighbor list having been reached; and
based at least in part on the end of the sorted neighbor list having not been reached:
determining whether the first cost value for the new link is greater than or less than a second cost value for a second link associated with the current position;
setting the current position of the second link to be a next item in the sorted neighbor list based at least in part on the first cost value for the new link being greater than the second cost value for the second link associated with the current position; and
inserting the new link into the current position in the sorted neighbor list based at least in part on the first cost value for the new link being less than the second cost value for the second link associated with the current position.

5. The method of claim 4, further comprising:
determining that both the new link and the second link are unsecure links; and
based at least in part on both the new link and the second link are the unsecure links:
determining whether a first trust value associated with the new link is greater than or less than a second trust value associated with the second link;
setting the current position of the second link to be the next item in the sorted neighbor list based at least in part on the first trust value associated with the new link being less than the second trust value associated with the second link; and
inserting the new link into the current position in the sorted neighbor list based at least in part on the first trust value associated with the new link being greater than the second trust value associated with the second link.

6. The method of claim 5, further comprising:
determining that the first trust value associated with the new link is equal to the second trust value associated with the second link;
determining whether the first cost value associated with the new link is greater than or less than the second cost value associated with the second link;
setting the current position of the second link to be the next item in the sorted neighbor list based at least in part on the first cost value associated with the new link being less than the second cost value associated with the second link; and
inserting the new link into the current position in the sorted neighbor list based at least in part on the first cost value associated with the new link being greater than the second cost value associated with the second link.

7. The method of claim 6, wherein the first trust value and the second trust value include a value of:
a first value if no customer certificates are associated with the new link or the second link, respectively;
a second value if an expired customer certificate that is based on a minimum time is associated with the new link or the second link, respectively; and
a third value if the customer certificates associated with the new link or the second link, respectively, passed a minimum time validation check.

8. The method of claim 1, wherein sending the time request to the first neighbor device of the plurality of neighbor devices based at least in part on the sorted neighbor list comprises:
selecting the first neighbor device at a top of the sorted neighbor list;
moving the first neighbor device to a blacklist; and
sending a first challenge with the time request.

9. A non-transitory computer-readable medium storing instructions that, when executed, cause a processor to perform operations, comprising:
receiving at a network interface controller (NIC) of a first device a neighbor list comprising a plurality of entries for a corresponding plurality of neighbor devices wherein each of the plurality of entries comprises:

a unique device identity of a time server which the plurality of neighbor devices has reached; and an inception time of a time server certificate corresponding to the unique device identity;

sorting the plurality of entries within the neighbor list to obtain a sorted neighbor list; and sending a time request to a first neighbor device of the plurality of neighbor devices based at least in part on the sorted neighbor list.

10. The non-transitory computer-readable medium of claim 9, the operations further comprising determining a minimum time, the minimum time being determined by:

determining whether the first device has a time;

obtaining the minimum time from a local storage of the first device based at least in part on the first device having no time;

identifying, for each of a plurality of certificates, a largest inception time;

determining if a first certificate is available;

retrieving the first certificate based at least in part on the first certificate being unavailable;

determining if the retrieving is successful;

removing the first certificate from the neighbor list based at least in part on the retrieving being unsuccessful;

setting the minimum time based at least in part on the retrieving being successful; and setting the minimum time based at least in part on the first certificate being available.

11. The non-transitory computer-readable medium of claim 10, the operations further comprising:

receiving, at the first device, a time response from the first neighbor device;

performing a preliminary check on the time response;

determining whether the certificate exists in a local storage of the first device;

requesting the certificate from the first neighbor device based at least in part on the certificate not existing in the local storage of the first device;

determining whether the certificate is received from the first neighbor device;

blacklisting the first neighbor device based at least in part on the certificate not being received from the first neighbor device;

validating the time based at least in part on the certificate being received from the first neighbor device; and validating the time based at least in part on the certificate existing in the local storage of the first device.

12. The non-transitory computer-readable medium of claim 9, wherein sorting the plurality of entries within the neighbor list to obtain the sorted neighbor list comprises performing a bubble sort or a quick sort of the plurality of entries, and wherein the sorting is based at least in part on one or more factors including a cost of a secure route to the time server, a trust value associated with a new link, a second trust value associated with a second link, a cost of a pending route, or combinations thereof.

13. The non-transitory computer-readable medium of claim 9, wherein the time server certificate is unique to one of a plurality of time servers.

14. The non-transitory computer-readable medium of claim 9, wherein the time server certificate is derived from a customer certificate authority.

15. The non-transitory computer-readable medium of claim 9, the operations further comprising storing the sorted neighbor list on the NIC.

16. The non-transitory computer-readable medium of claim 9, wherein sending the time request to the first neighbor device of the plurality of neighbor devices based at least in part on the sorted neighbor list comprises:

selecting the first neighbor device at a top of the sorted neighbor list;

moving the first neighbor device to a blacklist; and sending a first challenge with the time request.

\* \* \* \* \*